(12) United States Patent
Micka

(10) Patent No.: US 12,178,229 B1
(45) Date of Patent: *Dec. 31, 2024

(54) SYSTEMS AND METHODS FOR INHIBITING SPOILAGE OF STORED CROPS

(71) Applicant: JMC Enterprises, Inc., Kennewick, WA (US)

(72) Inventor: Joel Micka, Kennewick, WA (US)

(73) Assignee: JMC Enterprises, Inc., Kennewick, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/852,164

(22) Filed: Jun. 28, 2022

Related U.S. Application Data

(60) Continuation of application No. 16/843,775, filed on Apr. 8, 2020, now Pat. No. 11,399,555, which is a
(Continued)

(51) Int. Cl.
    *A61L 2/00* (2006.01)
    *A01F 25/00* (2006.01)
    (Continued)

(52) U.S. Cl.
    CPC ............ *A23L 3/3409* (2013.01); *A01F 25/00* (2013.01); *A23B 7/144* (2013.01); *A23L 3/34095* (2013.01); *F24F 3/14* (2013.01); *F24F 11/30* (2018.01); *A23V 2002/00* (2013.01); *F24F 8/24* (2021.01); *F24F 2110/50* (2018.01)

(58) Field of Classification Search
    CPC ..... A61L 2/0094; A23B 7/148; A23L 3/3418; F24F 11/0001

USPC ............ 422/1, 28, 32, 37, 305; 99/467, 470, 99/473–476

See application file for complete search history.

(56) References Cited

U.S. PATENT DOCUMENTS

| | | |
|---|---|---|
| 2,341,868 A | 2/1944 | Hitchcock et al. |
| 2,347,265 A | 4/1944 | Hyman |
| | (Continued) | |

FOREIGN PATENT DOCUMENTS

| | | |
|---|---|---|
| GB | 1035316 | 7/1966 |
| GB | 1054405 | 1/1967 |
| | (Continued) | |

OTHER PUBLICATIONS

"Adjustable-Speed Drives for When the Cows Come Home," Power Transmission Design, Nov. 1978, pp. 58-62, vol. 19, No. 11, ISSN 0032-6070, Penton/IPC, Inc., Cleveland, OH.
(Continued)

*Primary Examiner* — Monzer R Chorbaji
(74) *Attorney, Agent, or Firm* — Perkins Coie LLP

(57) ABSTRACT

Systems and methods for treating large quantities of potatoes, other tubers, vegetables, produce, and/or other crops are disclosed herein. In one embodiment, a crop storage facility configured in accordance with the present technology includes a treatment system configured to distribute a treatment agent configured to inhibit spoilage of the crops. The treatment system can include a combination of two or more chemical compositions configured to release different concentrations of the treatment agent to produce a desired level of the treatment agent in the storage facility.

20 Claims, 9 Drawing Sheets

Related U.S. Application Data continuation of application No. 16/520,273, filed on Jul. 23, 2019, now Pat. No. 10,638,780, which is a continuation of application No. 16/116,830, filed on Aug. 29, 2018, now Pat. No. 10,653,170, which is a division of application No. 15/594,523, filed on May 12, 2017, now Pat. No. 10,076,129.

(60) Provisional application No. 62/363,146, filed on Jul. 15, 2016.

(51) Int. Cl.
    *A23B 4/03* (2006.01)
    *A23B 7/144* (2006.01)
    *A23L 3/3409* (2006.01)
    *A61L 9/00* (2006.01)
    *F24F 3/14* (2006.01)
    *F24F 11/30* (2018.01)
    *F24F 8/24* (2021.01)
    *F24F 110/50* (2018.01)

(56) References Cited

U.S. PATENT DOCUMENTS

| | | | |
|---|---|---|---|
| 2,435,056 | A | 1/1948 | Schomer et al. |
| 2,460,792 | A | 2/1949 | Pabst et al. |
| 2,510,839 | A | 6/1950 | Shmidl |
| 2,541,701 | A | 2/1951 | Karmen et al. |
| 2,736,987 | A | 3/1956 | Martin |
| 2,850,615 | A | 9/1958 | Luse, Jr. et al. |
| 2,894,845 | A | 7/1959 | Stoddard |
| 2,978,333 | A | 4/1961 | Austin |
| 3,080,278 | A | 3/1963 | Douros, Jr. et al. |
| 3,113,875 | A | 12/1963 | Prater et al. |
| 3,128,170 | A | 4/1964 | Plant |
| 3,245,250 | A | 4/1966 | Parks, Jr. |
| 3,339,475 | A | 9/1967 | Martin |
| 3,357,201 | A | 12/1967 | Mitsunobu |
| 3,607,316 | A | 9/1971 | Hume |
| 3,633,825 | A | 1/1972 | Waldron |
| 3,742,094 | A | 6/1973 | Kume et al. |
| 3,788,066 | A | 1/1974 | Nebgen |
| 3,857,511 | A | 12/1974 | Govindan |
| 3,879,188 | A | 4/1975 | Fritz et al. |
| 3,884,161 | A | 5/1975 | Ankersen |
| 3,884,163 | A | 5/1975 | Ankersen |
| 3,913,661 | A | 10/1975 | Brug et al. |
| 3,949,733 | A | 4/1976 | Miller et al. |
| 3,978,235 | A | 8/1976 | Schiro |
| 4,078,480 | A | 3/1978 | Luck |
| 4,113,175 | A | 9/1978 | Sutton |
| 4,127,388 | A | 11/1978 | Maczko et al. |
| 4,148,926 | A | 4/1979 | Baker et al. |
| 4,148,927 | A | 4/1979 | Baker et al. |
| 4,154,656 | A | 5/1979 | Maurer |
| 4,167,584 | A | 9/1979 | Nelson |
| 4,200,657 | A | 4/1980 | Cook |
| 4,208,192 | A | 6/1980 | Quigley et al. |
| 4,216,238 | A | 8/1980 | Baker et al. |
| 4,226,179 | A | 10/1980 | Sheldon et al. |
| 4,241,871 | A | 12/1980 | Newell, III |
| 4,250,898 | A | 2/1981 | Utsch et al. |
| 4,266,179 | A | 5/1981 | Hamm |
| 4,270,358 | A | 6/1981 | Husain et al. |
| 4,291,617 | A | 9/1981 | Miller et al. |
| 4,332,137 | A | 6/1982 | Hayes, Jr. |
| 4,335,148 | A | 6/1982 | Vidal et al. |
| 4,335,273 | A | 6/1982 | Levin |
| 4,336,273 | A | 6/1982 | Lee |
| 4,336,814 | A | 6/1982 | Sykes et al. |
| 4,340,073 | A | 7/1982 | de la Burde |
| 4,351,849 | A | 9/1982 | Meade |
| 4,377,599 | A | 3/1983 | Willard |
| 4,382,077 | A | 5/1983 | Buchbinder |
| 4,388,892 | A | 6/1983 | Rody |
| 4,421,774 | A | 12/1983 | Vidal et al. |
| 4,449,541 | A | 5/1984 | Mays et al. |
| 4,479,079 | A | 10/1984 | Hanner |
| 4,499,833 | A | 2/1985 | Grantham |
| 4,532,156 | A | 7/1985 | Everest-Todd |
| RE32,013 | E | 10/1985 | de la Burde et al. |
| 4,568,019 | A | 2/1986 | Browning |
| 4,570,532 | A | 2/1986 | Labelle |
| 4,577,467 | A | 3/1986 | Ibrahim et al. |
| 4,622,119 | A | 11/1986 | Cerkanowicz et al. |
| 4,636,336 | A | 1/1987 | Gay et al. |
| 4,637,296 | A | 1/1987 | Hirosaki et al. |
| 4,651,072 | A | 3/1987 | Takata |
| 4,668,435 | A | 5/1987 | Grantham |
| 4,686,094 | A | 8/1987 | Roberts et al. |
| 4,704,134 | A | 11/1987 | Meyer et al. |
| 4,735,134 | A | 4/1988 | Brouwer |
| 4,743,436 | A | 5/1988 | Lyon |
| 4,772,315 | A | 9/1988 | Johnson et al. |
| 4,778,517 | A | 10/1988 | Kopatz et al. |
| 4,802,915 | A | 2/1989 | Kopats et al. |
| 4,814,612 | A | 3/1989 | Vestal et al. |
| 4,823,679 | A | 4/1989 | Robbins |
| 4,844,721 | A | 7/1989 | Cox et al. |
| 4,849,192 | A | 7/1989 | Lyon |
| 4,859,237 | A | 8/1989 | Johnson et al. |
| 4,876,802 | A | 10/1989 | Gergely et al. |
| 4,887,525 | A | 12/1989 | Morgan |
| 4,894,452 | A | 1/1990 | Stephan |
| 4,911,930 | A | 3/1990 | Gergely et al. |
| 4,927,456 | A | 5/1990 | Kopatz et al. |
| 4,960,992 | A | 10/1990 | Vestal et al. |
| 4,977,825 | A | 12/1990 | Morgan |
| 4,986,469 | A | 1/1991 | Sutton, Jr. |
| 5,009,152 | A | 4/1991 | Morgan |
| 5,041,245 | A | 8/1991 | Benado |
| 5,084,187 | A | 1/1992 | Wilensky |
| 5,129,951 | A | 7/1992 | Vaughn et al. |
| 5,139,562 | A | 8/1992 | Vaughn et al. |
| 5,156,747 | A | 10/1992 | Weber et al. |
| 5,167,838 | A | 12/1992 | Wilensky |
| 5,170,727 | A | 12/1992 | Nielsen |
| 5,171,455 | A | 12/1992 | Wang et al. |
| 5,244,866 | A | 9/1993 | Tayler |
| 5,260,022 | A * | 11/1993 | Schellhaas .......... A01M 17/008 422/4 |
| 5,277,707 | A | 1/1994 | Munk et al. |
| 5,306,350 | A | 4/1994 | Hoy et al. |
| 5,360,554 | A | 11/1994 | Sloan et al. |
| 5,376,045 | A | 12/1994 | Kiser |
| 5,389,389 | A | 2/1995 | Beck |
| 5,391,390 | A | 2/1995 | Leo |
| 5,395,455 | A | 3/1995 | Scott et al. |
| 5,436,226 | A | 7/1995 | Lulai et al. |
| 5,460,006 | A | 10/1995 | Torimitsu |
| 5,460,009 | A | 10/1995 | Wills et al. |
| 5,505,875 | A | 4/1996 | Beaujean et al. |
| 5,512,285 | A | 4/1996 | Wilde |
| 5,601,865 | A | 2/1997 | Fulger et al. |
| 5,622,912 | A | 4/1997 | Riggle et al. |
| 5,635,452 | A | 6/1997 | Lulai et al. |
| 5,711,211 | A | 1/1998 | Ide et al. |
| 5,723,184 | A | 3/1998 | Yamamoto |
| 5,811,372 | A | 9/1998 | Riggle et al. |
| 5,853,689 | A | 12/1998 | Klatte |
| 5,885,543 | A | 3/1999 | Klatte |
| 5,918,537 | A | 7/1999 | Forsythe et al. |
| 5,935,660 | A | 8/1999 | Forsythe et al. |
| 5,946,922 | A | 9/1999 | Viard et al. |
| 5,965,489 | A | 10/1999 | Forsythe et al. |
| 5,969,606 | A | 10/1999 | Reber et al. |
| 6,068,888 | A | 5/2000 | Forsythe et al. |
| 6,171,561 | B1 | 1/2001 | Williamson et al. |
| 6,174,508 | B1 | 1/2001 | Klatte |
| 6,310,004 | B1 | 10/2001 | Forsythe et al. |
| 6,322,002 | B1 | 11/2001 | Forsythe et al. |
| 6,379,643 | B1 | 4/2002 | Klatte |
| 6,423,277 | B1 | 7/2002 | Gravitt et al. |

(56) References Cited

U.S. PATENT DOCUMENTS

| | | | |
|---|---|---|---|
| 6,423,289 B1 | 7/2002 | Klatte | |
| 6,458,735 B1 | 10/2002 | Klatte | |
| 6,503,419 B2 | 1/2003 | Klatte | |
| 6,541,054 B2 | 4/2003 | Forsythe et al. | |
| 6,605,558 B2 | 8/2003 | Klatte | |
| 6,635,230 B2 | 10/2003 | Klatte | |
| 6,646,864 B2 | 11/2003 | Richardson | |
| 6,723,364 B1 | 4/2004 | Bompeix et al. | |
| 6,892,591 B2 | 5/2005 | Grossman et al. | |
| 6,992,546 B2 | 1/2006 | Chiang et al. | |
| 7,347,994 B2 | 3/2008 | Tenney et al. | |
| 7,644,591 B2 | 1/2010 | Singh et al. | |
| 7,922,992 B2 | 4/2011 | Ernst et al. | |
| 8,178,145 B1 | 5/2012 | Micka et al. | |
| 8,622,209 B2 | 1/2014 | Isaac et al. | |
| 8,709,396 B2 | 4/2014 | Tenney et al. | |
| 8,991,123 B2 | 3/2015 | Micka et al. | |
| 9,380,746 B2 | 7/2016 | Micka et al. | |
| 9,382,116 B2 | 7/2016 | Isaac et al. | |
| 9,414,611 B2 | 8/2016 | Ernst et al. | |
| 9,605,890 B2 | 5/2017 | Micka et al. | |
| 9,901,105 B2 | 2/2018 | Ernst et al. | |
| 10,076,129 B1 | 9/2018 | Micka et al. | |
| 10,455,844 B2 | 10/2019 | Ernst et al. | |
| 10,638,780 B1 | 5/2020 | Micka | |
| 10,653,170 B1 | 5/2020 | Micka | |
| 10,850,981 B2 | 12/2020 | Ernst et al. | |
| 11,274,270 B2 | 3/2022 | Hershey | |
| 11,399,555 B1 * | 8/2022 | Micka | A23L 3/3409 |
| 11,518,676 B2 | 12/2022 | Ernst et al. | |
| 2005/0137090 A1 | 6/2005 | Sardo | |
| 2005/0288184 A1 | 12/2005 | Keim et al. | |
| 2006/0270561 A1 | 11/2006 | Keim et al. | |
| 2007/0290062 A1 | 12/2007 | Forsythe et al. | |
| 2010/0179703 A1 | 7/2010 | Singh et al. | |
| 2011/0082591 A1 | 4/2011 | Micka et al. | |
| 2012/0012092 A1 | 1/2012 | Micka et al. | |
| 2012/0102986 A1 | 5/2012 | Micka et al. | |
| 2013/0053293 A1 | 2/2013 | Dituro et al. | |
| 2013/0071287 A1 | 3/2013 | O'Connell | |
| 2014/0260027 A1 | 9/2014 | Micka et al. | |
| 2014/0272046 A1 | 9/2014 | Micka et al. | |
| 2015/0164002 A1 | 6/2015 | Micka et al. | |
| 2015/0173381 A1 | 6/2015 | Micka et al. | |
| 2017/0051945 A1 | 2/2017 | Micka et al. | |
| 2018/0305209 A1 | 10/2018 | Ernst et al. | |
| 2020/0093146 A1 | 3/2020 | Ernst et al. | |
| 2022/0251482 A1 | 8/2022 | Hershey | |

FOREIGN PATENT DOCUMENTS

| | | |
|---|---|---|
| GB | 2250200 | 6/1992 |
| GB | 2347609 | 9/2000 |
| NL | 1013911 | 6/2000 |
| NL | 1011571 | 9/2000 |
| WO | 9509535 | 4/1995 |
| WO | 2004023878 | 3/2004 |
| WO | 2004024625 | 3/2004 |
| WO | 2011082352 | 7/2011 |
| WO | 2015095259 | 6/2015 |
| WO | 2018187683 | 10/2018 |

OTHER PUBLICATIONS

"Advanced Sprout Application Technology," Information Sheet, publicly available, Nov. 14, 2006, JMC Enterprises, Inc., Kennewick, WA.
"Amplify Aerosol Grade Potato Sprout Inhibitor," Directions for Use, publicly available Nov. 14, 2006, Platte Chemical Co., Greeley, CO.
"Biox Aerosol Product Data Sheet," Jun. 15, 1999, revised Mar. 18, 2005, Xeda International, France.
"Biox-C A Natural Sprout Inhibitor, Information and Directions for Use," publicly available Nov. 14, 2006, JMC Enterprises, Inc., Kennewick, WA.
"Decco 271 Aerosol Potato Sprout Inhibitor, Directions for Use," publicly available Nov. 14, 2006, Cerexagri Inc., Monrovia, CA.
"Decco 273 Aerosol Potato Sprout Inhibitor, Product Data," reviewed by State of California Department of Pesticide Regulation Aug. 30, 1995, ELF Atochem North America, Inc., Monrovia, CA.
"Deccosol 408 An Adjuvant, Handling and Storage Precautions," publicly available Nov. 14, 2006, Cerexagri, Inc., Monrovia, CA.
"Mint Oil Product Data Sheet," Oct. 7, 2004, revised Mar. 15, 2005, Xeda International, France.
"New Product 'Vaporizes' Load Rejection Problems," Industry News, publicly available Nov. 14, 2006, D-I-1-4, Inc., Meridian, ID.
"Potato Fan VFDs," Cascade Energy Engineering website, accessed Apr. 11, 2003, <http://www.cascadeenergy.com/cee_tool.cfm?app=energy_potatovfd_main>.
"Potato Storage Research Facility," University of Idaho Extension, page revised Mar. 31, 2003, <http://www.kimberly.uidaho.edu/potatoes.>.
"Potato Storage Research Shows Promise for Boosting Grower Profits," AgKnowledge, #169, publicly available Nov. 14, 2006, University of Idaho College of Agricultural and Life Sciences.
"Product Showcase," Potato Storage International, Jun. 2005, pp. 36-37.
"Specialty Product List," Pace International Webpage, Pace International LLC, accessed Aug. 8, 2008, <http://www.paceint.com/products.asp?prodid=4>.
"Speed Control of Fans During Application of Aerosol CIPC by Means of Frequency Adjustment of Fan Motor Supply Power," Apr. 15, 1988, Balivi Chemical Corporation, Boise, ID.
"Storage Chemicals Prove Answer for Challenge," reprinted from Potato Grower Magazine, Jan. 2003, vol. 32, No. 1.
"Talking Point," Potato Storage International, Mar. 2005, pp. 10-12.
"The Legend 1,4 SIGHT Applicator, User Guide," publicly available Nov. 14, 2006, D-I-1-4, Inc., Meridian, ID.
"Thermal and ULV Fogging Equipment," Nixalite webpage, accessed Aug. 8, 2008, <http://www.nixalite.com>.
"Thermofogging Has Arrived!" Sep. 2005, Pace International, accessed Sep. 25, 2008, <http://www.paceint.com/news.asp?newsid=9>.
"Treatments by Fogging," XEDA International S.A. Virtual Market Place, accessed Aug. 8, 2008, http://ww.virtualmarket.fruitlogistica.de.
"Variable Frequency Drive," Wikipedia, accessed Jan. 11, 2008, <http://en.wikipedia.org/wiki/Variable-frequncy_drive>.
"Variable Frequency Drives," JMC Ventilation Refrigeration, LLC, ã2005 JMC.
"Ventilation Systems," Potato Storage, 1983, pp. 14-18.
"Welcome to XEDA Group Website," 2004, accessed Aug. 8, 2008, <http://www.xeda.com/en/base.html>.
"XEDA Group Affiliates," Jul. 16, 2008, Xeda Group webpage, <http://www.xeda.com/en/base.html>.
"XEDA Group Agencies,", Jul. 15, 2008, Xeda Group webpage, <http://www.xeda.com/en/base.html>.
"Xeda O (OPP), Product Data Sheet," Jun. 14, 1999, revised Mar. 15, 2005, Xeda International, France.
"XEDAMATE 60, Product Data Sheet," Oct. 24, 2004, revised Mar. 15, 2005, Xeda International, France.
"Xedamine Aerosol 88 (DPA), Product Data Sheet," Jun. 14, 2000, revised Apr. 4, 2006, Xeda International, France.
"Xedaquine Aerosol (Ethoxyquin), Product Data Sheet," Dec. 12, 1997, revised Apr. 6, 2006, Xeda International, France.
"Xedaril D, Product Data Sheet," Nov. 11, 2004, revised Mar. 16, 2005, Xeda International, France.
"Xedazole Aerosol (TBZ), Product Data Sheet," Mar. 6, 1999, revised Jun. 4, 2006, Xeda International, France.
"Xedol Aerosol (OPP), Product Data Sheet," May 15, 2001, revised Sep. 29, 2005, Xeda International, France.
"1,4SHIP® Controls Peeps and Sprouts while Extending Shelf Life," publicly available Nov. 14, 2006, D-I-1-4, Inc., Meridian, ID.
"1,4SIGHT Aerosol Grade—Potato Dormancy Enhancer, Product Label," publicly available Nov. 14, 2006, D-I-1-4, Inc., Meridian, ID.

(56) References Cited

OTHER PUBLICATIONS

"1,4SIGHT A Revolutionary Potato Dormancy Enhancer for Sprout Control," publicly available Nov. 14, 2006, D-I-1-4, Inc., Meridian, ID.
"1,4SIGHT The New World of Enhancing Potato Dormancy," Jul. 30, 1998, Pasco, WA, Aug. 5, 1998, Merrill, OR.
"ABB ACS550 adjustable speed AC drive User's Manual," Diablosport Revision Update Instructions, publicly available Nov. 14, 2006.
"Aerosol Grade Sprout Nip 7A Directions for Use," publicly available Nov. 14, 2006, PPG Industries.
"Agricultural Chemical Usage Postharvest Applications—Apples and Potatoes," May 1998, United States Department of Agriculture, National Agricultural Statistics Service.
"Agricultural Chemical Usage Postharvest Applications—Oats and Potatoes Summary," Mar. 2007, United States Department of Agriculture, National Agricultural Statistics Board.
Allen, John P. C., et al., "A New Cost Effective Variable Frequency Drive for Centrifugal Loads," Conference Record Industry Applications Society IEEE-IAS-1983, Eighteenth Annual Meeting of the IEEE Industry Applications Society, Oct. 3-7, 1983, IEEE Catalog No. 83 CH1900-0, Library of Congress No. 80-640527.
Allen, Rich, "Frequency Drives Work, Evaluating Their Use for Potato Storage," Spudman, Jul. 1996, pp. 39-40.
Alvear, Sylvana de los Ángeles Soto, "Evaluación Dela Aplicación en Postcosecha del Funguicida 'Pyrimethanil' Vía Termonebulización en el Control de Botrytis Cinerea en Manzana CV. Fuji," publicly available Nov. 14, 2006, Universidad de Talca, (English Abstract Attached).
Amendment, U.S. Appl. No. 07/103,326, filed Jun. 21, 1988.
"AMPLIFY Sprout Inhibitor, product label," approved Sep. 28, 1999, Platte Chemical Co., Greeley, CO.
"Announcing 'Puff' Superior Sprout Inhibiting Apolication Technology from VSC," Feb. 23, 2005, Vegetable Storage Controls.
"Biox-C A Natural Sprout Inhibitor," Sep. 2003, JMC Enterprises, Inc., Kennewick, WA.
Bohl, William H. et al., "Variable Frequency Drive Fan Control for Potato Storage," The Spudvine, Nov. 2002, University of Idaho Extension, Blackfoot, ID.
Bucarey, Elizabet Carla Rosa Rosales, "Eficacia de Aplicación de los Fungicidas Fludioxonil, Thiabendazole y Pyrimethanil por Termonebulización ("Thermofogging") en Manzanas Red Delicious Sobre el Control de Botrytis Cinerea en Postcosecha," publicly available Nov. 14, 2006, Universidad de Talca, (English Abstract Attached).
Burton, W.G., "Suppression of Potato Sprouting in Buildings," publicly available Nov. 14, 2006, pp. 299-305.
"CIPC 98A Aerosol Grade Potato Sprout Inhibitor, Product Label," publicly available Nov. 14, 2006, Aceto Agricultural Chemicals Corporation, Lake Success, NY.
"Clean Crop Sprout Nip 7 Aerosol Precautionary Statements and Directions," publicly available Nov. 14, 2006, Platte Chemical Co., Greeley, CO.
Connors, Dennis P. et al., "Considerations in Applying Induction Motors with Solid State Adjustable Frequency Controllers," Oct. 3-7, 1983, IEEE Paper No. PCI-82-2, Reliance Electric Company, Cleveland, OH.
"Cornercroft Typhoon Storage Systems, sales pamphlet," publicly available Nov. 14, 2006.
Corsini, Dennis et al., "A Simplified Method for Determining Sprout-Inhibiting Levels of Chlorpropham (CIPC) in Potatoes," Journal of Agricultural Food Chemistry, 1978, pp. 990-991, vol. 26, No. 4, published by the American Chemical Society.
Corsini, Dennis et al., "Changes in Chlorpropham residues in Stored Potatoes," 1979, American Journal of Potato Research, vol. 56 No. 1, p. 43.
Cuffe, Stafford S. et al., "A Variable Frequency AC Blower Drive Installation for Efficient and Accurate Control of Glass Tempering," IEEE Transactions on Industry Applications, pp. 1047-1052, Jul.-Aug. 1985, vol. IA-21, No. 4.

"Decco 271 Aerosol Potato Sprout Inhibitor, Sample Precautionary Statements and Directions for Use," publicly available Nov. 14, 2006, Cerexagri Inc., Monrovia, CA.
"Decco 271 Aerosol, Product Label," publicly available Nov. 14, 2006, ELF Atochem North America, Inc., Monrovia, CA.
Declaration of Joel Micka in Support of Defendants' Claim Construction Brief, Case No. 1:07-cv-00353-BLW, May 6, 2008, United States District Court for the District of Idaho.
DeEll, Jennifer, "Research Updates from the 9th International Controlled Admosphere Research Conference," Aug. 15, 2005, accessed Sep. 25, 2008, Ontario Ministry of Agriculture Food and Rural Affairs. http://www.omafra.gov.on.ca/english/crops/hort/news/orchnews/2005/on0805a9.htm.
Duke, Russell A., "Chemical Sampling of Puff and Leco Chlorpropham Application Processes," Jun. 13, 1995, Prepared for Larry Koppes Vegetable Storage Controls.
"Energy-Efficient Electric Motors: Their Control and Application," Symposium Proceedings, Feb. 23, 1983, Bonneville Power Administration, Portland, OR.
Environmental Protection Agency Application for Pesticide and Certification with Respect to Compliance with PR Notice 98-10, Product Name CIPC 98A, May 8, 2003.
Environmental Protection Agency Notice of Pesticide Registration, Decco 270 Aerosol, Aug. 8, 1995.
"Farm Energy Centre—Controlling Condensation in Potato Stores," Jan. 1999, retrieved from the internet URL: http://www.fecservices.co.uk/DynamicContent/Documents/tech%20pubs/TN69%20Controlling%20condensation%20in%20potato%20stores.pdf.
Final Office Action; U.S. Appl. No. 11/940,275, mailed on Aug. 4, 2011, 28 pages.
Forbush, T.D. et al., "Sensing, Monitoring and Controlling Potato Storage Environments—A Process Report," For presentation at the 1987 Summer Meeting of the American Society of Agricultural Engineers, Jun. 28-Jul. 1, 1987, Baltimore Convention Center, Baltimore, MD.
Frazier, Mary Jo et al., "Organic and Alternative Methods for Potato Sprout Control in Storage," Univeristy of Idaho Extension, Idaho Agricultural Experiment Station, Sep. 2004, University of Idaho.
Frazier, Mary Jo et al., "Clove Oil for Potato Sprout and Silver Scurf Suppression in Storage," Presented at the Idaho Potato Conference on Jan. 19, 2006, University of Idaho.
"Get More Than Sprout Control 1,4 Sight," publicly available Nov. 14, 2006, D-I-1-4, Inc., Meridian, ID.
Good Fruit Grower, Good Fruit Magazine: Postharvest, accessed Oct. 12, 2008. <http://www.goodfruit.com/issues.php?article=329&issue=11>.
Graves, Bruce, "The Selection and Application of NEMA Frame Motors for Use with Adjustable Frequency Drives," Conference Record of 1984 Annual Pulp and Paper Industry Technical Conference, Jun. 19-22, 1984, ISSN 0190-2172, 1984 by the Institute of Electrical and Electronics Engineers, Inc.
Gray, Gleason et al., "Equipment for Chemical Treatment of Potatoes Moving into Storage," Research in the Life Sciences, Jul. 1975, pp. 1-11, vol. 23, No. 3, University of Maine at Orono Life Sciences and Agriculture Experiment Station.
"Grow Profits Not Sprouts," 2004, Aceto Agricultural Chemical Corporation.
Hanson, B. et al., "Performance of Electric Irrigation Pumping Plants Using Variable Frequency Drives," Journal of Irrigation and Drainage Engineering, May-Jun. 1996, pp. 179-182, vol. 122, No. 3, American Society of Civil Engineers Water Resources Engineering Division.
Hanson, B. et al., "Variable-Frequency Drives for Electric Irrigation Pumping Plants Save Energy," California Agriculture Magazine, Jan.-Feb. 1996, pp. 36-39, vol. 50, No. 1, University of California, Oakland, CA.
Heinze, P. H. et al., "Further Tests with 3-Chloro-Isopropyl-N-Phenyl Carbamate as a Sprout Inhibitor for Potato Tubers," American Potato Journal, vol. 32, pp. 357-361, Jan.-Dec. 1955.
Helmick, C. G., "Applying the Adjustable-Frequency Drive," EC&M, pp. 59-63, Sep. 1987.
Helmke, Dennis R., "A-C Adjustable Frequency Motor Control for Process Pumping Systems," Instrumentation in Food, Water, and

(56) References Cited

OTHER PUBLICATIONS

Wastewater Industries: Instrumentation for People, May 1980, pp. 39-43, programmed by ISA's Industries & Sciences Department's Divisions-Food Industry, Water and Wastewater Industries, ISA 1980, ISBN: 87664-472-8.
Hirnyck, Ronda, et al., "Pest Management Strategic Plan for Pacific Northwest Potato Production—Revision," Jul. 13, 2007, Summary of a workshop held on Jan. 26, 2006, Western Integrated Pest Management Center, Pocatello, ID.
International Search Report, International Application No. PCT/US94/11419, issued Dec. 5, 1994.
Johnson, G.A., "A Retrofit Accomplishment: From Constant Air to Variable, Alternative Airflow Control Techniques and Variable Speed Drive Help Convert Single-Zone Constant Volume to Single-Zone Variable Air Volume System," Ashrae Journal, Jan. 1985, pp. 106-114, vol. 27, No. 1, ISSN-0001-2491, by the American Society of Heating, Refrigerating and Air Conditioning Engineers, Atlanta, GA.
"Aerosol Formulations for Thermal Aerosol Generators, Pesticide Formulations and Application Systems," 1996, vol. 16, ASTM STP 1312, Michael J. Hopkinson, Herbert M. Collins, G. Robert Goss, Eds., American Society for Testing and Materials.
Sprout Nip Aerosol Application Field Handbook, Apr. 7, 1987, Keim, WA.
Kim, Mie-Soon Lee et al., "Effects of Chloropropham (CIPC) on Sprouting of Individual Potato Eyes and on Plant Emergence," American Potato Journal, 1972, pp. 420-431, vol. 49.
Kleinkopf, Gale E. and Mary Jo Frazier, "Alternative Sprout Suppressants for Stored Potatoes," Idaho Potato Conference, Jan. 23, 2002.
Kleinkopf, Gale et al., "Progress Report for Project BJ-K812, Methods for Sprout and Disease Suppression of Potatoes in Storage," publicly available Nov. 14, 2006, UI Kimberly R&E, Kimberly, ID.
Kleinkopf, Gale et al., "Progress Report Project BJ-K912, Methods for Sprout and Disease Suppression of Potatoes in Storage," publicly available Nov. 14, 2006, UI Kimberly R&E, Kimberly, ID.
Koski, Steve et al., "Potato Fan VFDs Phase 2 Report," Oct. 2003, prepared for Northwest Energy Efficiency Alliance, Portland, OR.
Koski, Steve, "VFD Application in Onion Storages," Onion Storage VFDs, pp. 1-2, revised May 20, 2003, Cascade Energy Engineering.
Kupferman, Eugene et al., "Managing Storage Scald in Anjou Pears," Final Project Report, WTFRC Project No. PR-06-603, publicly available after Jan. 4, 2007, Washington State University Tree Fruit Research and Extension Center, Wenatchee, WA.
Leco Potato Fogger Fog Generator Instruction Manual and Parts List 1989, Lowndes Engineering Co., Inc., Valdosta, GA.
Lemeronde, Corey, "VFDs Speed Production, Ease Maintenance for RMG/FELM Wire Processing Customers," Drives Mag, 1997-2004 DrivesMag.com, accessed Aug. 2, 2004, <http://www.drivesurvey.com/index_library.cfm?feature_id=96>.
Letter from Frank J. Dykas to Phil Hagenah, regarding Novelty Search Sprout Inhibitor, dated Feb. 24, 1988.
Letter from J.E. Jensen to W.R. Neilson, regarding Sprout Nipâ 7A Research, dated Jul. 8, 1985.
Letter from Mike Frelleson to All Applicators regarding University of Idaho Study, dated Dec. 21, 2004.
Letter from W.A. Keim to J.E. Jensen, regarding Sprout Nip Aerosol, dated May 22, 1985.
Lewis, M.D et al., "Dimethylnapthalene and Diisopropylnaphthalene for Potato Sprout Control in Storage: 1. Application Methodology and Efficacy," American Potato Journal, 1997, pp. 183-197, vol. 74.
Mcclung, Bruce L., "A Closer Look at Adjustable Frequency Alternating Current Variable Speed Drive Systems," Proceedings of the First Annual Control Engineering Conference: held as Part of the Control Engineering Conference, published by Control Engineering, 1982, pp. 169-171.
Moggia, C. et al., "Effect of DPA Reapplication by Thermofogging on Scald Control in Apples," (English Abstract), Vicerrectoria Academica Direccion de Promamas de Investigacion, Journal No. 4, Universidad de Talca, accessed Oct. 12, 2008. <ftp://colbum.utalca.cl/Documentos/Diat/jornadas_investigacion/jornada_4/4taJornada.pdf>.
Moggia, Claudia et al., "Use of Thermofogging for DPA and Fungicides Applications in Chile," Washington Tree Fruit Postharvest Conference, Dec. 2-3, 2003, 2003 Proceedings, pp. 1-10. Wenatchee, WA.
Morgan, Charlie, "Using Technology to Reduce Sprouting," Potato Grower of Idaho, publicly available Nov. 14, 2006, pp. 6-7.
Morton, Robert D. et al., "Evaporator Fan Variable Frequency Drive Effects on Energy and Fruit Quality," 16th Annual Postharvest Conference, Mar. 14-15, 2000, Washington State University Tree Fruit Research and Extension Center Postharvest Information Network, Yakima, WA.
Morton, Robert D. et al., "Evaporator Fan VFD Effects on Energy and Fruit Quality," publicly available Nov. 14, 2006, Cascade Energy Engineering.
Non-Final Office Action; U.S. Appl. No. 13/174,650, mailed on Mar. 21, 2014, 9 pages.
Non-Final Office Action; U.S. Appl. No. 11/940,275, mailed on Nov. 26, 2010, 15 pages.
Non-Final Office Action; U.S. Appl. No. 12/859,759, mailed on Dec. 28, 2012, 32 pages.
Notice of Allowance; U.S. Appl. No. 11/940,275, mailed on Mar. 9, 2012, 13 pages.
Oberg, Nathan A., et al., "Impact of Ventilation System Operation on Stored Potato Quality, Shrinkage and Engery Use Efficiency," Jan. 22, 2003, Presented at the Idaho Potato Conference.
Office Action, U.S. Appl. No. 07/103,326, dated Jun. 14, 1990.
Office Action, U.S. Appl. No. 07/103,326, mailed Mar. 21, 1988.
Olsen, Nora et al., "Biox-C 2004 Research Summary," publicly available Nov. 14, 2006, University of Idaho, Kimberly, ID.
Papez, J.S., "Adjustable Flow with Adjustable Frequency," Power Transmission Design, Nov. 1978, pp. 58-62, vol. 19, No. 11, ISSN 0032-6070, Penton/IPC, Inc., Cleveland, OH.
Pin Nip 7A Aerosol Grade Potato Sprout Inhibitor Directions for Use, publicly available Nov. 14, 2006, Pin Nip, Inc., Boise, ID.
PIN NIP Enjoy Solid Success in Sprout Control Technology, publicly available Nov. 14, 2006, PIN/NIP, Inc., Meridian, ID.
Pin Nip 98.6% Chlorpropham Aerosol Grade Potato Sprout Inhibitor Directions for Use, publicly available Nov. 14, 2006, Pin Nip, Inc., Boise, ID.
Pin Nip 98.6% Chlorpropham, Label and Directions for Use, Oct. 7, 1997.
"Potato Fan VFDs 'Can VFDs Boost My Bottom Line?'," publicly available Nov. 14, 2006, published with support from the University of Idaho, Northwest Energy Efficiency Alliance, and Cascade Energy Engineering.
"Potato Fan VFDs Phase 1 General Report," revised May 23, 2002, prepared by Cascade Energy Engineering, Inc., Walla Walla, WA.
"Problems in the Use of Sprout Inhibitors," pp. 42-47, publicly available Nov. 14, 2006.
"Process for Inhibiting Sprouting of Stored Potatoes," Preliminary Draft, Sep. 10, 1987.
Professor Profile for Nora L. Olsen, Extension Potato Specialist and Associate Extension Professor, University of Idaho, Idaho Center for Potato Research and Education, accessed Nov. 27, 2007. <http://www.ag.uidaho.edu/potato/people/olsen.htm>.
Rastovski, A. et al., "Sugars and Starch During Tuberization, Storage and Sprouting," Storage of Potatoes Post-Harvest Behavior, Store Design, Storage Practice, Handling, 1981, pp. 82-96, Centre for Agricultural Publishing and Documentation, Wageningen.
"Relief for Sprouting and Pressure Bruise," publicly available Nov. 14, 2006, One Four Group, Meridian, ID.
Reregistration Eligibility Decision (RED) Letter for Chlorpropham, Environmental Protection Agency, Prevention, Pesticides, and Toxic Substances, Oct. 1996.
Roemhildt, David, "Sprout Inhibiting: New Product Reduces Tuber Stress," pp. 14-15, Sep. 1995, Potato Country.
Salyani, M. et al., "Deposition Efficiency of Different Droplet Sizes for Citrus Spraying," Transactions of the ASAE, Nov.-Dec. 1987, pp. 1595-1599, vol. 30, No. 6, 1987 American Society of Agricultural Engineers.

(56) References Cited

OTHER PUBLICATIONS

"Sample Application Program-Norkotah, Ranger, or Chipper," publicly available Nov. 14, 2006, One Four Group, Meridian, ID.
Sawyer, R. L., "Relation of Chloro IPC for Potato Sprout Inhibition to Internal Sprouting of Potatoes," American Potato Journal, vol. 38, pp. 203-207, Jan.-Dec. 1961.
Sawyer, R.L. et al., "Vaporized Chemical Inhibitors and Irradiation, Two New Methods of Sprout Control for Tuber and Bulb Crops," Proceedings of the American Society for Horticultural Science, Jun. 1956, pp. 516-521, vol. 67, Published by The Society, Cornell University, Ithaca, NY.
Scholey, Douglas, "Induction Motors for Variable Frequency Power Supplies," IEEE Transactions on Industry Applications, Jul.-Aug. 1982, pp. 368-372, vol. IA-18, No. 4.
Selke, Gregory H., "Future Trends in Applications and Marketing of Adjustable Frequency A.C. Motor Drives," Proceedings of the Third Annual Control Engineering Conference, pp. 83-88, May 22-24, 1984, Technical Publishing Company, held as part of the Control Engineering Conference and Exposition, Rosemont, IL.
Solowjow, Alex O., "Variable Fan-Speed Control—A Simple and Effective Method for Reducing Plant Energy Costs," Plant Engineering, pp. 55-57, vol. 40, No. 2, ISSN 0032-082X, Jan. 23, 1986, Technical Publishing, Barrington, IL.
Sprout Torch Potato Sprout Exterminator, Label Sample, transmitted via fax Mar. 11, 2005, 1,4GROUP, Inc., Meridian, ID.
Stringer, Loren F., "Synchonous Motor Adjustable Frequency Drive Systems for Large Mechanical-Draft Fans," Proceedings of the American Power Conference, 1980, pp. 488-500, vol. 42, ISSN UU97-2126, Illinois Institute of Technology, Chicago, IL.
"Talk Tips for 1,4SHIP," publicly available Nov. 14, 2006, D-I-1-4, Inc.
Tallant, Dennis, "Fanning the Cost of Energy," Telephone Engineer & Management, pp. 100-104, Feb. 15, 1981.
Techmark, Inc.'s Techlines, No. 1, 2002, Techmark, Inc., Lansing, MI.
Toshiba Transistorized PWM Inverter VF Pack-P1, 230V/460VClass 1-88kVA, Technical Data, Jan. 1987.
Urano, A.S et al., "System Benefits and Considerations When Using AC Adjustable-Frequncy Drives in Generating Stations," Proceedings of the American Power Conference, pp. 515-528, vol. 43, 1981, Illinois Institute of Technology, Chicago, IL.
Wilcox, Marcus H. et al., "The Evaporator Fan VFD Initiative," 14th Annual Postharvest Conference, Mar. 10-11, 1998, Washington State University Tree Fruit Research and Extension Center Postharvest Information Network, Yakima, WA.
Wilson, D. M., Prairie Potato Council, Feb. 15, 1983.
Wilson, J.B et al., "Airflow Effect on Distribution of Isopropyl N-(3-Chlorophenyl) Carbamate (Chloro-IPC) Applied to Bulk Bins of Potatoes," American Potato Journal, vol. 42, No. 1, pp. 1-6, Jan. 1965.
Xu, et al., "Modeling the Application of Chemicals in Box Potato Stores," Pest Management Sciences. vol. 56, pp. 111-119, 2000.
Yost, John C., Jr., et al., "Experiences with Adjustable Frequency Fan Drives," Proceedings of the 1983 16th Annual Frontiers of Power Conference, pp. III-1-III-4, Oct. 10-11, 1983, Oklahoma State University, Stillwater, OK.
Micka, Joel. 'Declaration of Joel Micka', executed Jul. 23, 2019.
Email from Dale A. Malone titled "Re: JMC Enterprises—U.S. Pat. No. 10,076,129," dated Oct. 4, 2019, 2 pages.
Email from Dale A. Malone titled "Re: JMC Enterprises—U.S. Pat. No. 10,076,129 Exhibit set 1," dated Oct. 4, 2019, 1 page (referred to as "Re: JMC Enterprises—Exhibit set 1'").
Email from Dale A. Malone titled "Re: JMC Enterprises—U.S. Pat. No. 10,076,129 Exhibit set 2," dated Oct. 4, 2019, 1 page (referred to as "Re: JMC Enterprises—Exhibit set 2'").
Email from Dale A. Malone titled "Re: JMC Enterprises—U.S. Pat. No. 10,076,129 Exhibit set 3," dated Oct. 4, 2019, 1 page (referred to as "Re: JMC Enterprises—Exhibit set 3'").
Exh. 1-1, email from Joel Tenney titled "Re: Canadian potatoes" dated Feb. 8, 2016, 3 pages, from "Re: JMC Enterprises—Exhibit set 1."
Exh. 1-2, email from Dave Paulshock titled "RE: Fruit gard" dated Oct. 21, 2015, 6 pages, from "Re: JMC Enterprises - Exhibit set 1."
Exh. 1-3, photograph titled "Black Lake Oct. 27, 2015", 1 page, from "Re: JMC Enterprises—Exhibit set 1."
Exh. 1-4, email from Dave Paulshock titled "Fwd: pail system instructions" dated Nov. 23, 2015, 2 pages, from "Re: JMC Enterprises—Exhibit set 1."
Attachment to Exh. 1-4, document titled "CUTSHEET—Pail Diffuser Construction Instructions", published on or before Nov. 23, 2015, 1 page.
Exh. 1-5, photograph titled "Mixer Oct. 17, 2016 California Tomato Exchange", 1 page, from "Re: JMC Enterprises—Exhibit set 1."
Exh. 1-6, document titled "Joint Confidentiality Agreement" dated Aug. 1, 2017, from "Re: JMC Enterprises—Exhibit set 1."
Exh. 1-7, photograph titled "Dimare Jan. 2016", 1 page, from "Re: JMC Enterprises—Exhibit set 1."
Exh. 1-10, photograph titled "Mack Farms May 2013", 1 page, from "Re: JMC Enterprises—Exhibit set 1."
Exh. 1-11, photograph titled "RDOFFUTT 2 (Dec. 2015)", 1 page, from "Re: JMC Enterprises—Exhibit set 1."
Exh. 1-12, photograph titled "RDOFFUTT Dec. 2015", 1 page, from "Re: JMC Enterprises—Exhibit set 1."
Exh. 1-13, photograph titled "Warm air transfer picture Dec. 5, 2016", 1 page, from "Re: JMC Enterprises—Exhibit set 1."
Exh. 3-1, photograph titled "Multiple Applications 1", 1 page, from "Re: JMC Enterprises—Exhibit set 2."
Exh. 3-2, photograph titled "Multiple Applications 2", 1 page, from "Re: JMC Enterprises—Exhibit set 2."
Exh. 5-1, PowerPoint presentation titled "Food Defend Power Point 1", published on or before Jul. 16, 2016, 37 pages, from "Re: JMC Enterprises—Exhibit set 2."
Exh. 10-1, email from Joel Tenney titled "Re: Questions for Alpha Grp re FruitGard 091315" dated Sep. 30, 2015, 5 pages, from "Re: JMC Enterprises—Exhibit set 3."
Attachment to Exh. 10-1, document titled "Questions for Alpha Grp re FruitGard" dated on or before Sep. 30, 2015, 4 pages.
Exh. 11-1, document titled "Label—Fruitgard Zeoair Drum 5.5×8.5 150729", published on or before Jul. 16, 2016, 1 page, from "Re: JMC Enterprises—Exhibit set 3."
Exh. 11-2, document titled "Label Fruitgard Maintenance A & B Food Defend 8×5", 1 page, from "Re: JMC Enterprises—Exhibit set 3."
Exh. 11-3, document titled "Label Fruitgard Wipeout A & B Food Defend 8×5", 1 page, from Re: JMC Enterprises—Exhibit set 3.
Exh. 11-4, document titled "Revised Cut Sheet—Potato Fruitgard—FOODDFEND copysm", published on or before Jul. 16, 2016, 1 page, from "Re: JMC Enterprises—Exhibit set 3."
Exh. 12-1, document titled "Biswell Blower—media—blower unit drawing", 1 page, from "Re: JMC Enterprises—Exhibit set 3."
Exh. 12-2, photograph titled "Blower 2013 Mack Farms Florida Omni Directional", 1 page, from "Re: JMC Enterprises—Exhibit set 3."
Exh. 12-3, photograph titled "Biswell Blower—media—blower unit", 1 page, from "Re: JMC Enterprises—Exhibit set 3."
Exh. 13-1, PowerPoint presentation titled "Food Defend Power Point 3", 37 pages, from "Re: JMC Enterprises—Exhibit set 3."

* cited by examiner

SYSTEMS AND METHODS FOR INHIBITING SPOILAGE OF STORED CROPS

RELATED APPLICATIONS

This application is a continuation of U.S. patent application Ser. No. 16/843,775, filed Apr. 8, 2020 (now U.S. Pat. No. 11,399,555), which is a continuation of U.S. patent application Ser. No. 16/520,273, filed Jul. 23, 2019 (now U.S. Pat. No. 10,638,780), which is a continuation of U.S. patent application Ser. No. 16/116,830, filed Aug. 29, 2018 (now U.S. Pat. No. 10,653,170), which is a divisional of U.S. patent application Ser. No. 15/594,523, filed May 12, 2017 (now U.S. Pat. No. 10,076,129), which claims the benefit of U.S. Provisional Application No. 62/363,146, filed Jul. 15, 2016. The disclosure of each these applications is incorporated herein by reference in its entirety.

TECHNICAL FIELD

The following disclosure relates generally to systems and associated methods for inhibiting spoilage and/or decay of potatoes and other tubers, crops, produce and the like.

BACKGROUND

Potatoes and other tubers, vegetables, crops and produce are typically held in large storage facilities after harvest to maintain quality and provide a uniform supply of product to market. Modern potato storage facilities, for example, can often hold more than 20,000 tons of potatoes in piles as high as 20 feet. These piles, however, can generate considerable heat from respiration of the potatoes. One ton of stored potatoes, for example, can generate about 2 BTUs of heat per day. For this reason, conventional storage facilities typically include ventilation systems for cooling the potatoes. In addition, these facilities typically include systems for controlling the air temperature and humidity to prevent excessive dehydration, decay, and the development of high sugar concentrations in the potatoes. Table potatoes, for example, are typically stored at about 40°–45° F. and about 95% relative humidity, while potatoes for making chips or French fries are typically stored at about 45-55° F. and about 95% relative humidity. Maintaining the humidity in potato storage facilities at, e.g., above 90% can significantly reduce shrinkage and corresponding profit losses. Potatoes in these conditions are still susceptible to spoilage and rot. Conventional crop storage facilities may use one or more treatment agents (e.g., chlorine dioxide gas) released into the air inside the facilities and directed toward the stored crops. However, the production and/or release of the treatment agents may be significantly inhibited or prevented by the conditions in which potatoes are typically stored.

DETAILED DESCRIPTION

Figure 1A:
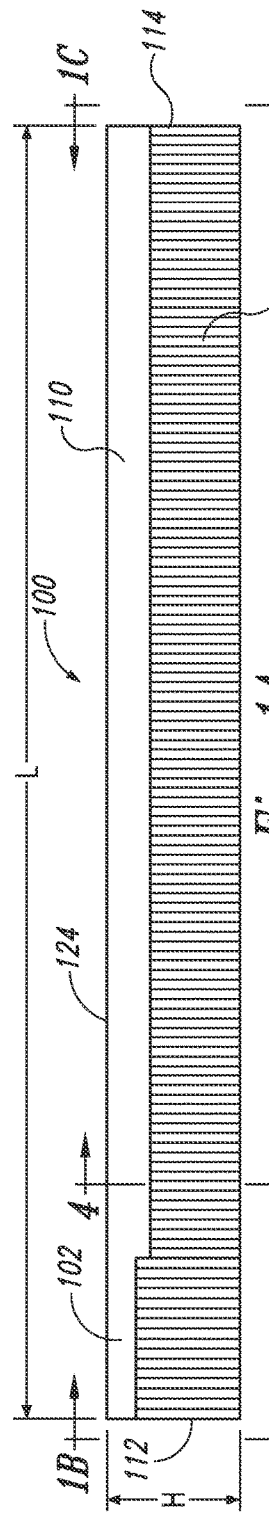
FIGS. 1A, 1B and 1C are side, front and rear elevation views, respectively, of a crop storage facility configured in accordance with an embodiment of the present technology.

The following disclosure describes various embodiments of facilities and associated systems for storing and tracking large quantities of potatoes, other vegetables, and/or other crops under favorable conditions. In one embodiment, for example, a crop storage facility includes an inlet configured to receive air from outside the crop storage facility, and a first system for flowing a first portion of air from the inlet to a crop storage area in the facility. A container in the crop storage facility is configured to hold a crop treatment composition that is configured to produce a crop treatment agent (e.g., chlorine dioxide). A second system for flowing a second portion of air from the inlet to the container facilitates the production of the crop treatment agent. In one aspect, the second portion of air is warmer than the first portion of air. In some aspects, the second system includes a blower positioned in an enclosure that is fluidly coupled to the container.

Certain details are set forth in the following description and in FIGS. 1A-6 to provide a thorough understanding of various embodiments of the present technology. In other instances, well-known structures, materials, operations and/or systems often associated with tuber (e.g., potato) storage facilities, other types of agricultural product storage facilities, building construction, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
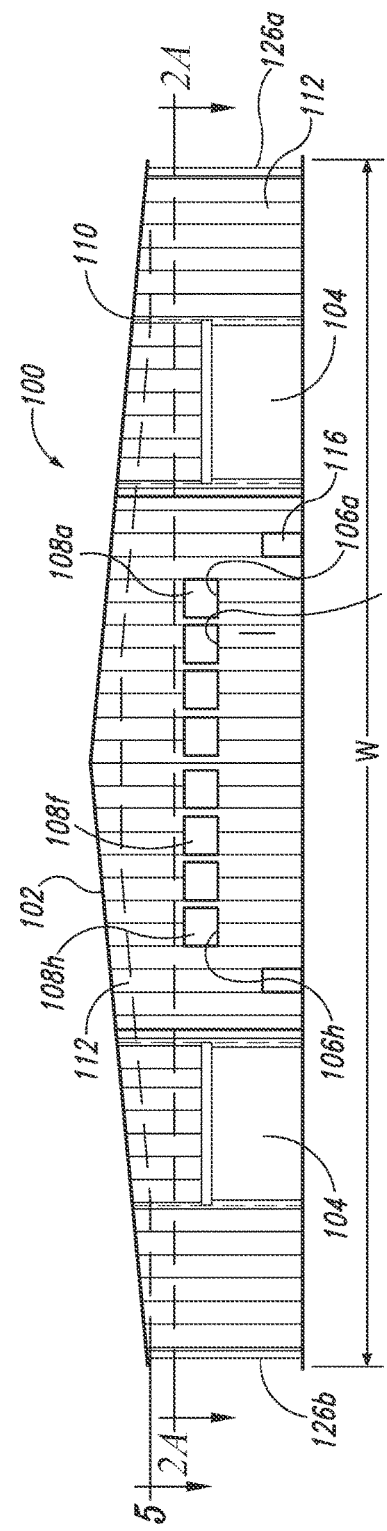
Figure 1C:
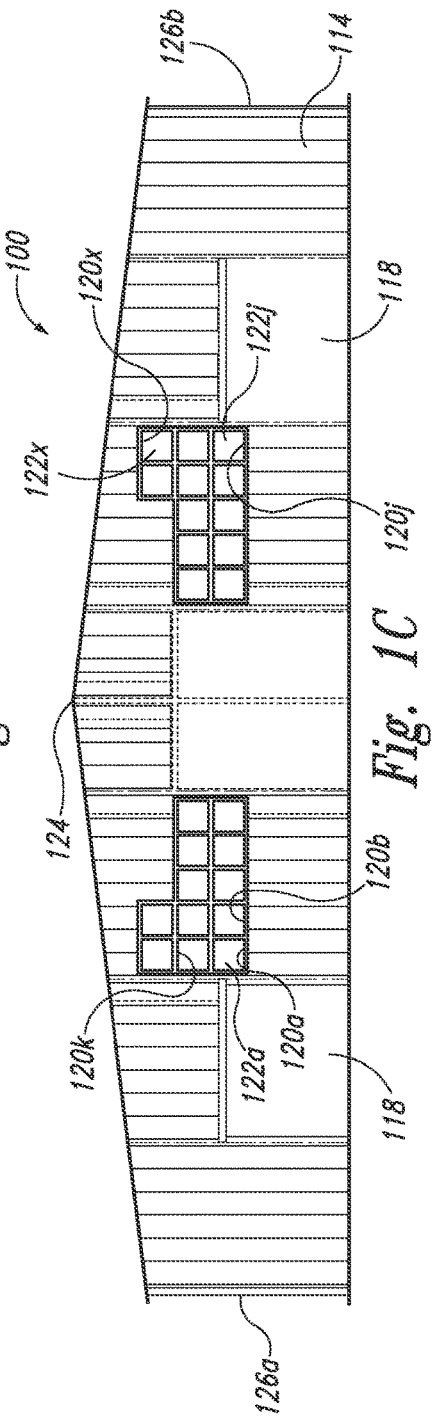

FIGS. 1A, 1B and 1C are side, front and rear elevation views, respectively, of a storage facility 100 configured in accordance with an embodiment of the present technology. The storage facility 100 can be used to store potatoes and other tubers, onions, carrots, and other types of agricultural products, crops, produce, etc. Although the storage facility 100 is described herein in the context of a potato storage facility, those of ordinary skill in the art will understand that the storage facility 100 and various structural and functional aspects thereof can also be used to advantageously store other tubers, vegetables, crops and/or produce. Accordingly, the technology disclosed herein is not limited to potato storage facilities unless specifically indicated as such, and in general is equally applicable to other crop storage facilities. In some embodiments, the storage facility 100 can be at least generally similar in structure and function to the storage facilities disclosed in U.S. Pat. No. 8,991,123, titled ENVIRONMENTALLY CONTROLLED STORAGE FACILITY FOR POTATOES AND OTHER CROPS, and filed on Apr. 15, 2013, which is incorporated herein by reference in its entirety.

Referring to FIGS. 1A and 1B together, in the illustrated embodiment the storage facility 100 includes a fan house 102 positioned toward a front portion of a crop storage area 110. The fan house 102 includes a plurality of openings or vents, such as air inlets 106 (identified individually as air inlets 106a-h) formed in an exterior front wall 112. Each of the air inlets 106 can be selectively opened or closed by a corresponding door 108 (identified individually as inlet doors 108a-h). The positions of the inlet doors 108 relative to the corresponding air inlets 106 can be adjusted (e.g., individually adjusted) as desired to control the amount of outside air flowing into the storage facility 100 via the fan house 102. The fan house 102 can also include two smaller doors 116 toward opposite sides to enable persons to enter and exit the adjacent fan rooms, and each side of the storage area 110 can include a larger door 104 (e.g., a large roll up door) to allow trucks and other vehicles (not shown) to transport large quantities of potatoes to and/or from the adjacent storage bay.

Referring next to FIGS. 1A and 1C together, the storage facility 100 can include an exterior rear wall 114 having an array of openings, vents or apertures, such as air outlets 120 (identified individually as air outlets 120a-x). Each of the air outlets 120 can include a corresponding door 122 or other adjustable closure device (identified individually as doors 122a-x) that can be used to control the flow of air out of the storage facility 100. The rear wall 114 can additionally include two large doors 118 for vehicle access that are similar in structure and function to the large doors 104 (FIG. 1B) at the front of the storage area 110.

In the illustrated embodiment, the storage facility 100 can be manufactured using conventional materials and techniques known in the art for constructing agricultural product storage facilities. Such materials and techniques can include, for example, welded and fastened steel framing erected on a concrete pad or foundation, and covered with relatively thin sheet metal siding and roof panels (e.g., corrugated or formed sheet metal siding and roof panels). In the illustrated embodiment, the storage facility 100 can have a length L from the front wall 112 to the rear wall 114 of from about 150 feet to about 500 feet or more, or from about 250 feet to about 450 feet, or about 390 feet. The storage facility 100 can have a height H from the ground to a roof ridge line 124 of from about 20 feet to about 50 feet, or from about 25 feet to about 40 feet, or about 37 feet. The storage facility 100 can have a width W from a right or first exterior side wall 126a to a left or second exterior side wall 126b of from about 60 feet to about 300 feet, or from about 100 feet to about 200 feet, or about 155 feet. In other embodiments, the storage facility 100 and various embodiments thereof can have other suitable shapes and sizes, and can be constructed from other suitable materials and techniques known in the art without departing from the present disclosure.

Figure 1D:
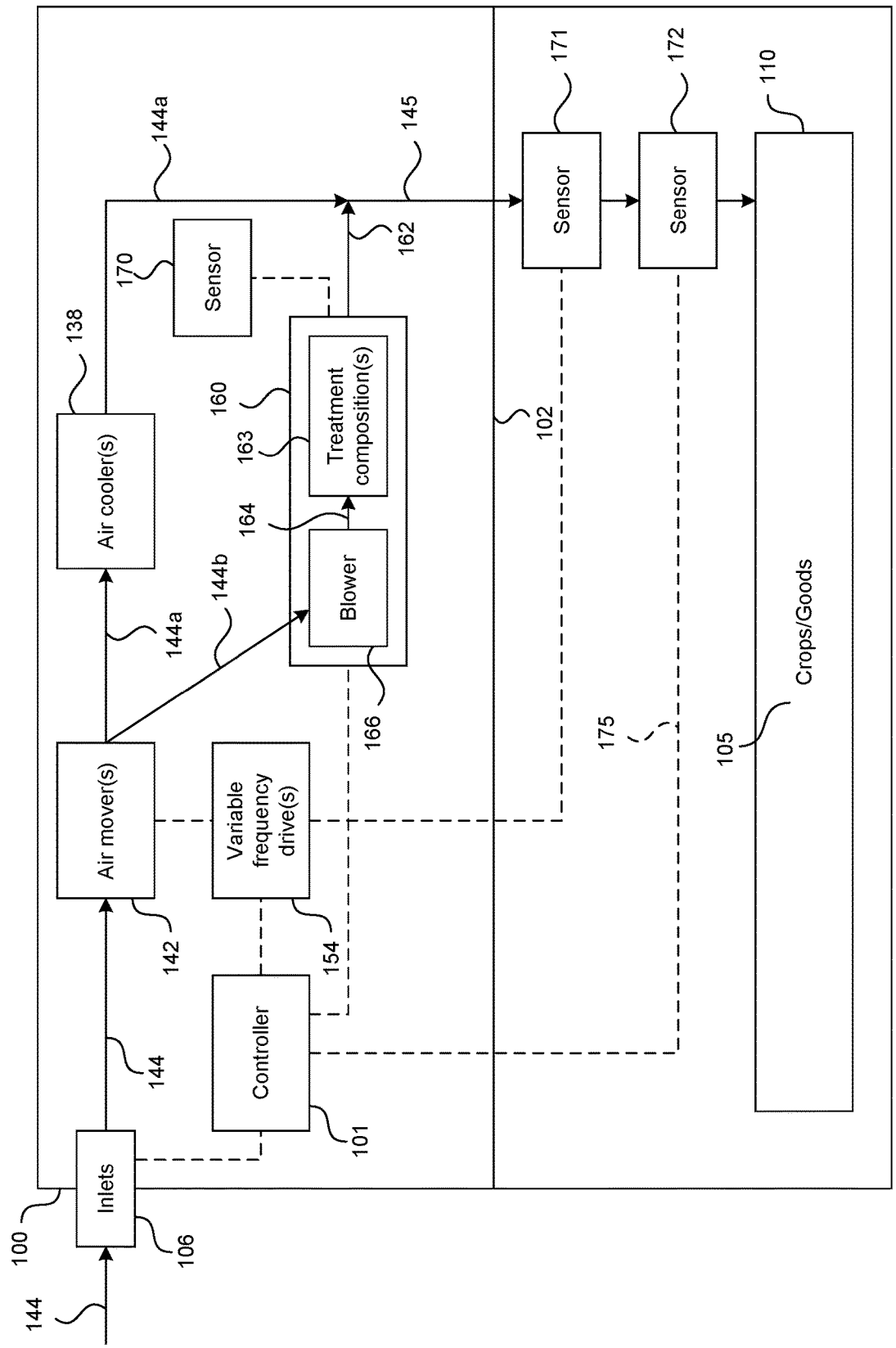
FIGS. 1D and 1E are schematic views of the crop storage facility configured in accordance with embodiments of the present technology.

FIG. 1D is a schematic view of the storage facility 100. In the illustrated embodiment, the storage facility 100 includes one or more air movers 142 (e.g., one or more fans), one or more air coolers 138 (e.g., one or more evaporative coolers), and a crop treatment system 160. The one or more air movers 142 are configured to draw outside air 144 into the storage facility 100 via the air inlets 106 (e.g., one or more of the air inlets 106a-h of FIG. 1B) and provide a first portion 144a of the outside air 144 to the one or more air coolers 138. A second portion 144b of the outside air 144 flows from the one or more air movers 142 toward the crop treatment system 160. The first air portion 144a is cooled by the one or more air coolers 138 and then flows toward the storage area 110. The second air portion 144b is used by the crop treatment system 160 to facilitate the release of a crop treatment agent 162 (e.g., chlorine dioxide $ClO_2$, ozone $O_3$ and/or ozonated water $H_2O_3$, hydrogen peroxide $H_2O_4$, peracetic acid $CH_3CO_3H$, and/or sodium hypochlorite $NaClO$). The treatment agents 162 flow from the crop treatment system 160 and mix with the cooled first air portion 144a to form mixed air 145. The mixed air 145 can also be referred to herein as "treated air." The mixed or treated air 145 flows toward stored crops or goods 105 (e.g., potatoes, onions, etc.) stored in the storage area 110, thereby inhibiting growth of organisms (e.g., bacteria, viruses, fungi, etc.) that can cause spoilage, decay and/or rot of the goods 105.

The one or more air inlets 106 can be opened and closed in varying degrees to change the amount of air admitted to the storage facility 100, and the one or more air coolers 138 can be operated at different levels to decrease a temperature and/or increase a moisture content within the storage facility 100 when the outside air 144 is warmer or cooler than a desired interior temperature. In some embodiments, one or more variable frequency drives (VFD) 154 can alter revolutions per minute (RPM) of the one or more air movers 142 to control the throughput of the one or more air movers 142 with great accuracy and reliability. A controller 101 can be configured to control and regulate the one or more air movers and/or the one or more VFDs 154. In some embodiments, for example, the controller 101 operates based on manual input from an operator. In other embodiments, however, the controller 101 can include a programmed set of instructions for operating one or more systems in the storage facility.

The crop treatment system 160 includes one or more treatment compositions 163 (e.g., one or more combinations of a zeolite and sodium chlorite) that are configured to release the treatment agents 162 into the surrounding area to mix with the cooled first air portion 144a and form the mixed air 145. In some embodiments, the crop treatment system 160 includes an air mover 166 (e.g., a fan or blower) that receives the second air portion 144b from the one or more air movers 142. The blower 166 can direct a warm, dry portion of the second air portion 144b toward the treatment compositions 163 to facilitate the release of the treatment agents 162 into the storage facility 100. The blower 166 can also facilitate mixing of the treatment agents 162 with the cooled first air portion 144a in an efficient and consistent manner. For example, pressurized air from the blower 166 can carry the treatment agents 162 toward the rear wall 114 of the storage facility 100 (FIGS. 1A and 1C) to ensure that the treatment agents 162 are well dispersed in the storage area 110. The treatment agents 162 can inhibit growth of, for example, bacteria, viruses, fungi and/or other undesirable organisms that can cause spoilage and/or disease in the goods 105 stored in the storage area 110. The treatment agents 162 can also reduce or eliminate undesirable odors in the storage facility 100. In one aspect of this embodiment, the treatment compositions 163 include one or more chemical compositions configured to release chlorine dioxide into the storage facility 100. The chemical compositions can include, for example, a composition comprising a zeolite and sodium chlorite $NaClO_2$. In some embodiments, the chemical compositions include a zeolite crystal impregnated with citric acid $C_6H_8O_7$. acetic acid $CH_3COOH$, ferric chloride $FeCl_3$, and/or phosphoric acid $H_3PO_4$. In other embodiments, the one or more chemical compositions can include another suitable composition configured to produce the treatment agents 162.

A first sensor 170 (e.g., a scale) is configured to determine an unreleased amount of the treatment compositions 163 remaining in the crop treatment system 160. In some embodiments, the first sensor 170 can be a scale or other weight sensing device that is placed underneath a container holding the treatment compositions 163 to determine their weight, which can be used to determine the amount of the treatment compositions 163 remaining in the container. As discussed in more detail below, the crop treatment system 160 can be configured to notify an operator if the first sensor 170 detects an amount of the treatment compositions 163 that is less than a predetermined threshold (e.g., less than 5% of a full capacity of the treatment compositions 163).

A second sensor 171 is configured to determine whether the one or more air movers 142 are operating. If the second sensor 171 fails to detect that the one or more air movers 142 are operating, the second sensor 171 can transmit a signal (e.g., via a wire or radio link) to the controller 101 to shut off and/or disengage operation of the blower 166. Automatic shut off of the blower 166 when the one or more air movers 142 are not operating can advantageously prevent levels of the treatment agents 162 in the mixed air 145 from exceeding unsafe levels (e.g., 50 parts per million (ppm) or higher) for human activities in the storage facility 100. In one embodiment, for example, the second sensor 171 can include a pressure sensor configured to determine a static pressure level of air in the storage facility 100. The static pressure level in the storage facility 100 may decrease, for example, below a predetermined static pressure level if the one or more air movers 142 are not operating at a corresponding predetermined fan rotation speed (e.g., 25 Hertz (Hz) or greater). The second sensor 171 can be configured to transmit a signal to the controller 101 if/when the static pressure in the storage facility 100 drops below the predetermined static pressure level. In other embodiments, however, the second sensor 171 can include another suitable sensor (e.g., a relay electrically coupled to the one or more air movers 142) configured to detect operation of the one or more air movers 142. Moreover, in the illustrated embodiment, the second sensor 171 is shown positioned downstream of the one or more air coolers 138 and the crop treatment system 160. In other embodiments, however, the second sensor 171 can be positioned at any suitable location in the storage facility 100. In one embodiment, for example, the second sensor 171 is positioned in the fan house 102 (FIG. 1B) and/or another location proximate the one or more air movers 142.

A third sensor 172 is configured to determine a concentration of the treatment agents 162 in the mixed air 145 distributed toward the stored goods 105 in the storage area 110. In some embodiments, for example, the third sensor 172 includes an infrared sensor, a mass spectrometry sensor and/or another suitable sensor configured to detect the treatment agents 162 (e.g., chlorine dioxide gas). An electrical link 175 (e.g., one or more wires and/or wireless connections) communicatively couples the third sensor 172 to the controller 101. The third sensor 172 can be configured, for example, to transmit a signal indicative of a measured concentration of the treatment agents 162 in the mixed air 145 to the controller 101 via the link 175. If the measured concentration of the treatment agents 162 is not within a desired range (e.g., between about 5 ppm and 25 ppm), the controller 101 can be configured to respond to the signal by adjusting the operation of the one or more air movers 142 to bring the concentration of the treatment agents 162 to within the desired range. In one aspect of this embodiment, the controller 101 can communicate with the one or more VFDs 154 to adjust an airflow within the storage facility 100. For example, if the concentration of the treatment agents 162 is below the desired range, the one or more VFDs 154 can be configured to control the one or more air movers 142 to reduce the airflow in the storage facility 100 from a first airflow (e.g., between about 15 cubic feet per minute (cfm) and about 100 cfm, between about 20 cfm and about 50 cfm, or about 25 cfm) to a second airflow (e.g., between about 0.1 cfm and about 15 cfm, between about 3 cfm and about 10 cfm, or about 5 cfm) to increase the concentration of the treatment agents 162 in the mixed air 145. Conversely, an increase in the airflow generated by the one or more air movers 142 can cause a corresponding decrease in the concentration of the treatment agents 162 released by the crop treatment system 160. Without being bound by theory, if, for example, the third sensor 172 detects an excessive concentration (e.g., greater than 30 ppm) of the treatment agents 162, the controller 101 can be configured to adjust the one or more VFDs 154 to increase the airflow (e.g., from 5 cfm to 25 cfm) of the one or air movers 142 until the third sensor 174 detects that the concentration of the treatment agents 162 is within a desirable range (e.g., between about 5 ppm and 20 ppm).

The controller 101 can include a programmable logic controller (PLC) or other microprocessor-based industrial control system that communicates with components of the storage facility 100 (e.g., the sensors 170, 171 and/or 172) through data and/or signal links to control switching tasks, machine timing, process controls, data manipulation, etc. In this regard, the controller 101 can include one or more processors that operate in accordance with computer-executable instructions stored or distributed on computer-readable media. The computer-readable media can include magnetic and optically readable and removable computer discs, firmware such as chips (e.g., EEPROM chips), magnetic cassettes, tape drives, RAMs, ROMs, etc. Indeed, any medium for storing or transmitting computer-readable instructions and data may be employed. The controller 101 and embodiments thereof can be embodied in a special purpose computer or data processor that is specifically programmed, configured or constructed to perform one or more of the machine operations explained in detail below. Those of ordinary skill in the relevant art will appreciate, however, that the storage facility 100 and components such as the air inlets 106, the one or more air movers 142, and the one or more air coolers 138 can be controlled with other types of processing devices including, for example, multi-processor systems, microprocessor-based or programmable consumer electronics, network computers, and the like. Data structures and transmission of data and/or signals particular to various aspects of the controller 101 are also encompassed within the scope of the present disclosure.

Figure 1E:
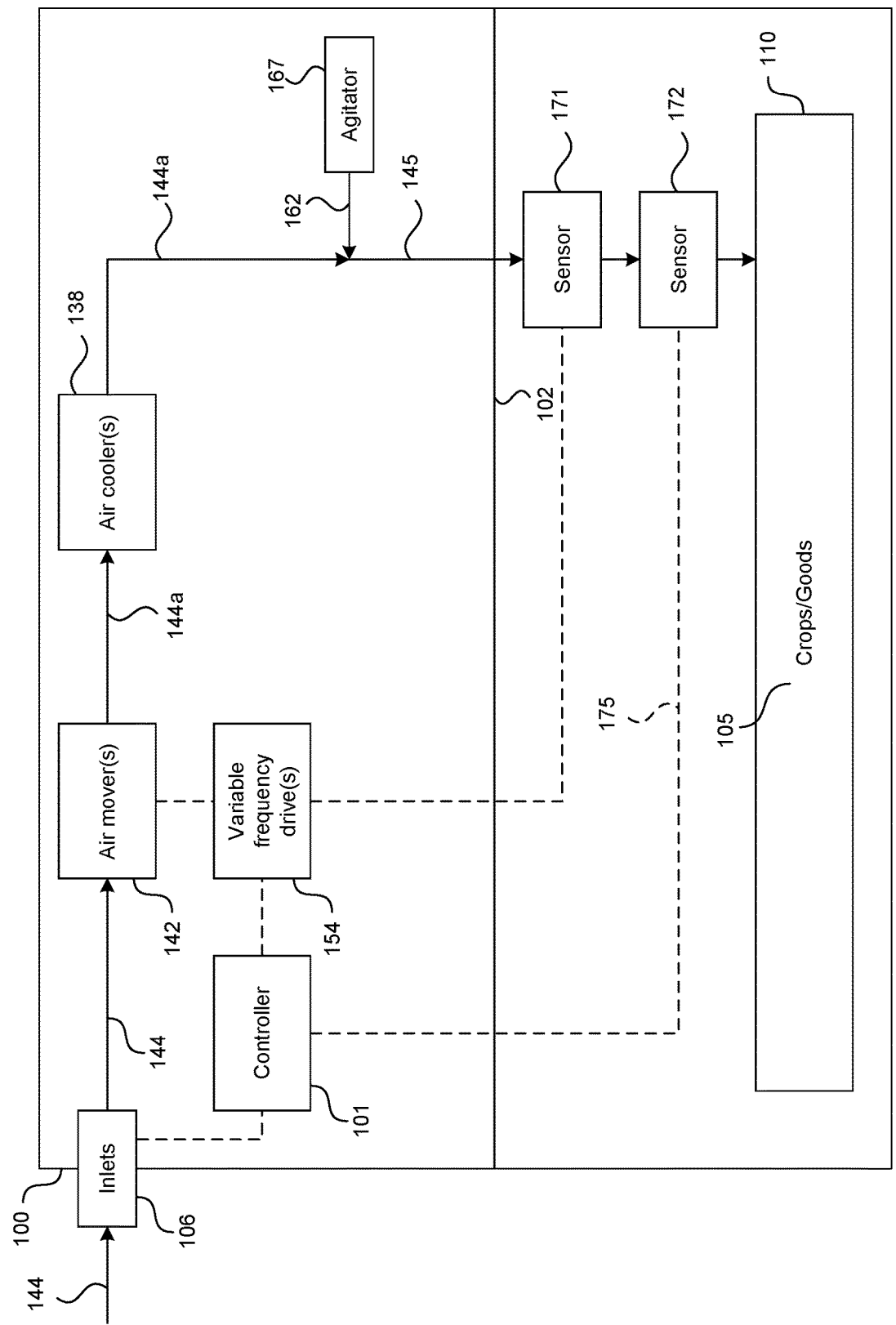

FIG. 1E is a schematic view of the storage facility 100 configured in accordance with another embodiment of the present technology. In the illustrated embodiment, the storage facility 100 includes many of the same structures and functions described above with reference to FIG. 1D. For example, the storage facility 100 includes the one or more air movers 142 and the one or more air coolers 138. However, in this embodiment, the storage facility 100 includes an agitator 167 instead of or in addition to the crop treatment system 160. The agitator 167 is a rotatable mixing device that mixes the treatment compositions 163 to produce the treatment agents 162. As described in further detail below, the agitator 167 is configured to release the treatment agents 162 into the surrounding area to mix with the cooled first air portion 144a and form the mixed air 145. As noted above, the mixed air 145 flows toward the goods 105 stored in the storage area 110, thereby inhibiting spoilage, decay and/or rot of the goods 105.

Figure 2A:
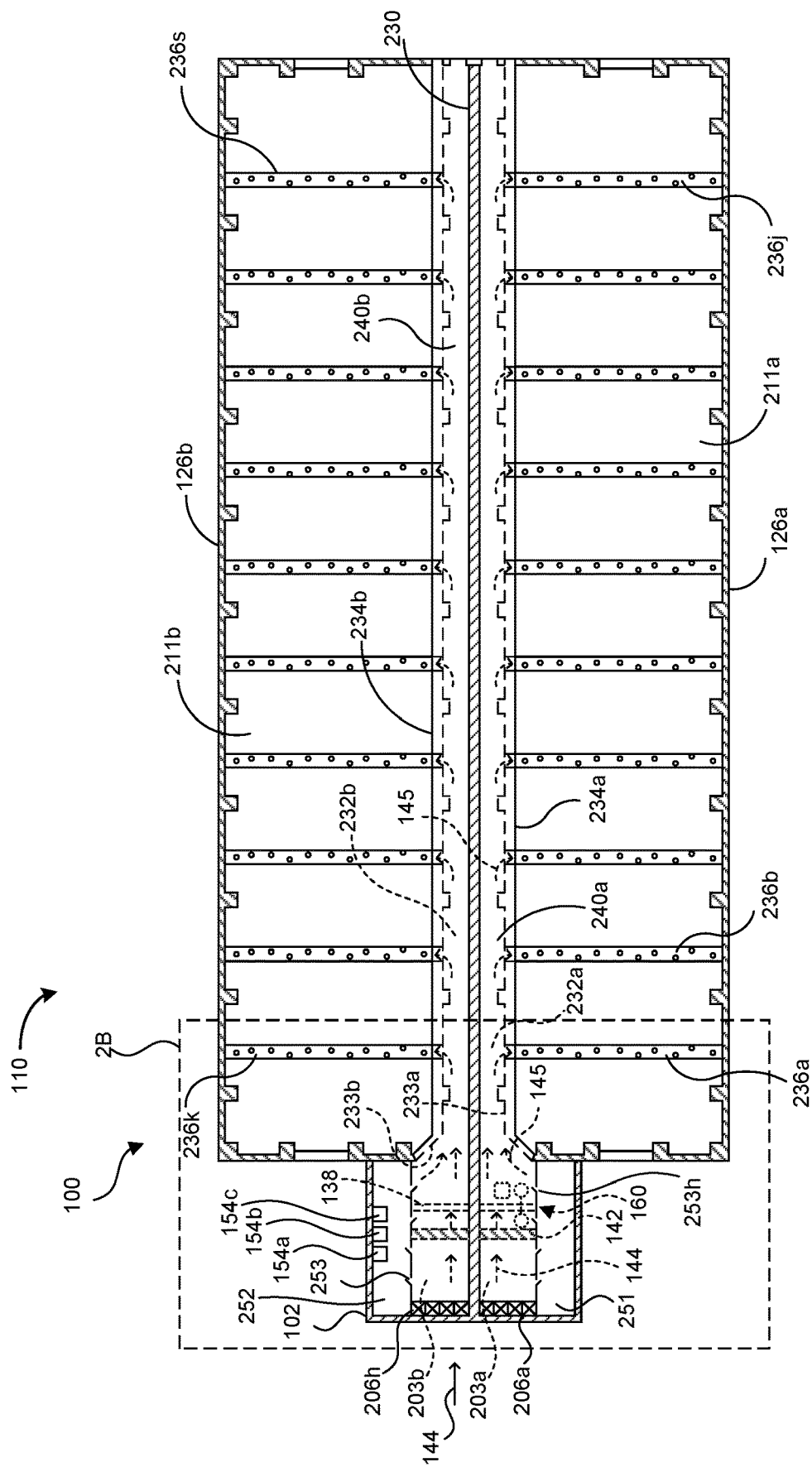
FIG. 2A is a cross-sectional top plan view of the storage facility of FIGS. 1A-1C taken substantially along line 2A-2A in FIG. 1B.
Figure 2B:
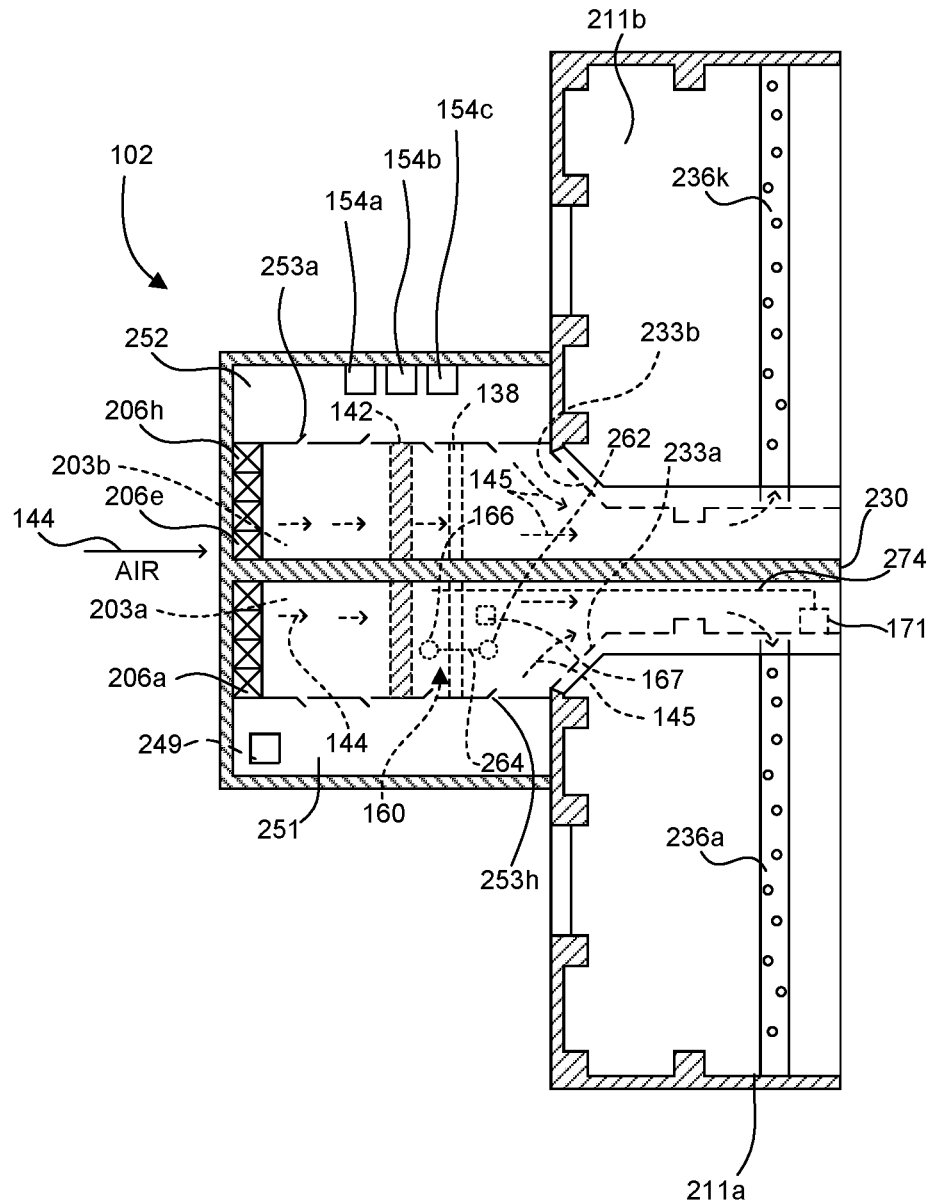
FIG. 2B is an enlarged view of a portion of FIG. 2A.

FIG. 2A is a cross-sectional top view taken along line 2A-2A in FIG. 1B just above mezzanine decks 240 (identified individually as a right or first mezzanine deck 240a and a left or second mezzanine deck 240b). FIG. 2B is an enlarged view of a portion of FIG. 2A. Referring first to FIG. 2A, the storage facility 100 includes a central partition wall 230 extending upwardly from the building foundation to at least proximate the roof ridge line 124 (FIG. 1C). In this embodiment, the storage facility 100 is generally symmetrical about the central partition wall 230, with the central partition wall 230 dividing the fan house 102 into two adjacent fan rooms 203 (identified individually as a right or first fan room 203a and a left or second fan room 203b), and the storage area 110 into two adjacent potato storage bays 211 (identified individually as a right or first storage bay 211a and a left or second storage bay 211b). A first side room 251 (e.g., a control room) is adjacent the first fan room 203a, and a second side room 252 is adjacent the second fan room 203b.

In operation, the first fan room 203a provides air (e.g., cool and/or humid air) to the first storage bay 211a, and the second fan room 203b provides air (e.g., cool and/or humid air) to the second storage bay 211b. For ease of reference and understanding, portions of the following description describe the various structures and functions of the storage facility 100 from the perspective of the first fan room 203a and the first storage bay 211a. It should be understood, however, that because of the symmetry of the illustrated embodiment the description of these structures and functions applies equally well to the second fan room 203b and the second storage bay 211b on the opposite side of the partition wall 230. In other embodiments, however, storage facilities configured in accordance with the present technology can be unsymmetrical, and/or they can have only a single potato storage bay or more than 2 storage bays. Accordingly, the technology disclosed herein is not limited to symmetrical storage facilities.

Referring to FIGS. 2A and 2B together, the one or more air movers 142 draw the outside air (indicated by the arrows 144) into the first fan room 203a through the air inlets 106a-d and then through the one or more air coolers 138. In the illustrated embodiment, the one or more air movers 142 can be conventional fans known to those of ordinary skill in the art and suitable for industrial applications, such as electric motor-driven axial fans. In other embodiments, other types of air movers (e.g., centrifugal fans, crossflow fans, etc.) can be used to draw air into the first fan room 203a via the air inlets 106a-d. The one or more VFDs 154 (identified individually as a first VFD 154a, a second VFD 154b and a third VFD 154c) positioned in the second side room 252 can be configured to adjust an airflow produced by the one or more air movers 142 as discussed above in reference to FIG. 1D.

The one or more air coolers 138 can be any type of suitable air coolers known in the art including, for example, an evaporative water cooler (e.g., a wet air cooler, "swamp cooler." etc.), a refrigerant cycle air conditioner, or other conventional air cooling/conditioning system known to those of skill in the art for use in such facilities. In some embodiments, the one or more air coolers 138 is an evaporative water cooler that increases the moisture content in the air. In certain embodiments, the one or more air coolers 138 can comprise a cellulose medium such as, for example, CelDEK manufactured by Cooling Media-UMP. In other embodiments, the one or more air coolers 138 can comprise another suitable material configured to cool and/or increase the moisture content in the air. As those of ordinary skill in the art will appreciate, increasing the moisture content of the air can advantageously reduce dehydration and shrinkage of tubers and other crops stored in the storage facility 100. In some other embodiments, however, a heater (not shown) configured to dry and warm the incoming air can be included in at least one of the first fan room 203a and/or the second fan room 203b.

As shown in FIG. 2B, the illustrated embodiment includes the crop treatment system 160 having a conduit, such as a duct, pipe or hose 264, fluidly coupling a treatment application container 262 (shown downstream of the one or more air coolers 138) to the blower 166 upstream of the one or more air coolers 138. As described in further detail below, the application container 262 can hold the treatment compositions 163 (FIG. 1D). In some embodiments, the hose 264 can routed under, over or around the one or more air coolers 138. As noted above and described in further detail below in reference to FIGS. 3A and 3B, the crop treatment system 160 is configured to produce a crop treatment agent that inhibits crop spoilage and/or disinfects the storage facility 100. In some embodiments, the crop treatment system 160 is configured to produce gaseous chlorine dioxide using a chemical composition that includes, for example, sodium chlorite and a zeolite. It may be preferable to store potatoes, onions and/or other produce in cool, humid air, having a temperature, for example, between about 38 degrees Fahrenheit and about 70 degrees Fahrenheit, and a humidity of about 90% of greater. However, cool, humid air can inhibit or otherwise prevent the production of gaseous chlorine dioxide using a composition including sodium chlorite, zeolite and/or other suitable chemicals. Treatment systems in conventional storage facilities can have blowers and application containers placed downstream of air movers and air coolers in the same conditions as the air moving therethrough. This air can have a relatively high humidity (e.g., 90% or higher), which can inhibit production of treatment agents (e.g., chlorine dioxide). However, simply placing the treatment agents upstream of the cooler 138 may not be preferable for at least the reason that the cooler may absorb much of the treatment agents before it can be directed toward the goods 105. The inventors have discovered, however, that positioning the blower 166 in a different environment (e.g., a warm, dry environment) and directing warm, dry air toward the application container 262 downstream of the cooler 138 can increase production of gaseous chlorine dioxide and/or other treatment agents in potato storage facilities. In some embodiments, the application container 262 can also be placed away from the discharge of the one or more air coolers 138 in, for example, the first side room 251 or outside the crop storage facility 100. In such embodiments, the treatment agents 162 flowing out of the application container 262 can be piped or otherwise directed toward the cooled first air portion 144a (FIG. 1D) exiting the cooler 138.

In the illustrated embodiment of FIGS. 2A and 2B, the blower 166 is positioned upstream of the one or more air coolers 138 and the application container 262 is positioned downstream of the one or more air coolers 138. If the outside air 244 is relatively warm and dry (e.g., warmer than about 68 degrees Fahrenheit and having a humidity of 70% or less), the blower 166 can move the warm, dry air into the application container 262 via the hose 264. Alternatively, in some embodiments, the blower 166 can be placed outside the storage facility 100, or in other warm and dry conditions. If, however, the outside air 244 is relatively cool and humid (e.g., cooler than about 68 degrees Fahrenheit and having a humidity greater than 70%), then placing the blower 166 upstream of the one or more air coolers 138 may not be sufficient to provide the application container 262 with warm, dry air. In some other embodiments, therefore, the blower 166 can be positioned in the first side room 251, in which a heater 249 (FIG. 2B) warms and/or dehumidifies the air to sufficient levels such that the air blown from the blower 166 to the application container 262 via the hose 264 is suitable for the production of the treatment agents 162 (e.g., chlorine dioxide gas). In some other embodiments, the blower 166 can be positioned in an enclosure in the fan house 102 or another suitable location, as described below in reference to FIG. 3A.

As described above with reference to FIG. 1E, in some embodiments, the storage facility 100 can include the agitator 167 to release the treatment agents 162 into the surrounding area. In these embodiments, the agitator 167 can be positioned downstream of the one or more air coolers 138 such that the treatment agents 162 produced from the agitator 167 mix with the cooled first air portion 144a from the cooler 138. In operation, the one or more air movers 142 move air to be treated by the crop treatment system 160 from each of the respective fan rooms 203 into a corresponding air plenum 232 (identified as a right or first air plenum 232a and a left or second air plenum 232b) as indicated by the arrows 145. In some embodiments, the storage facility 100 can also include angled side wall portions 233a, b extending between each of the fan rooms 203 and a respective plenum side wall 234 to provide a smooth transition for air flowing from the fan rooms 203 into the respective air plenums 232. Each of the air plenums 232 is formed by the central partition wall 230 on one side, the corresponding plenum side wall 234a, b on the opposite side, and a plenum ceiling that extends beneath the respective mezzanine decks 240. In the illustrated embodiment, each of the mezzanine decks 240 provides a ceiling over the respective fan room 203 as well as a walkway above the air plenums 232 that extends adjacent to the respective storage bay 211.

Referring again to FIG. 2A, the air flowing through each of the plenums 232 flows into a series of pipes or ducts 236 (identified individually as ducts 236a-j in the first storage bay 211a, and ducts 236i-s in the second storage bay 211b) through corresponding openings in the plenum side walls 234. The ducts 236 extend transversely across each of the potato storage bays 211 from the plenum side wall 234 to at least proximate the exterior side wall 126. Each of the ducts 236 can include a plurality of apertures or openings for distributing the air received from the respective plenum 232 under the potatoes (not shown) piled thereon. The ducts 236 can also be used to distribute and apply substances, such as spoilage inhibiting substances, sprout inhibiting substances, etc., onto the potatoes and/or other stored crops using various methods and systems known in the art.

The mezzanine deck 240 can include a series of recirculation air openings or vents 206a-h adjacent the front wall 112 (FIG. 1A). When the recirculation vents 206 are open or at least partially open, the air movers 142 draw air from the mezzanine 240 down into the fan rooms 203. In the illustrated embodiment, each of the recirculation vents 206 is operably aligned with one of the air inlets 106 and one of the inlet doors 108 (FIG. 1B). In operation, the inlet doors 108 can be manually or automatically rotated or moved by a suitable mechanism known in the art between a first position (i.e., an upper position) in which the door 108 fully closes the corresponding recirculation vent 206 and opens the corresponding air inlets 106, a second position (i.e., a lower position) in which the door 108 opens the corresponding recirculation vent 206 and fully closes the corresponding air inlets 106, and essentially any desired position in between the first and second positions. Fully opening, for example, the recirculation vent 206c and thereby closing the corresponding air inlet 106c increases the recirculation of air through the first fan room 203a. Conversely, fully closing the recirculation vent 206c and thereby fully opening the air inlet 106c increases the flow of outside air into the first fan room 203a. Additionally, the position of the inlet door 108c can also be adjusted to any point in between these two positions to permit air to flow into the first fan room 203a via both the recirculation vent 206c and the air inlet 106c.

Figure 3A:
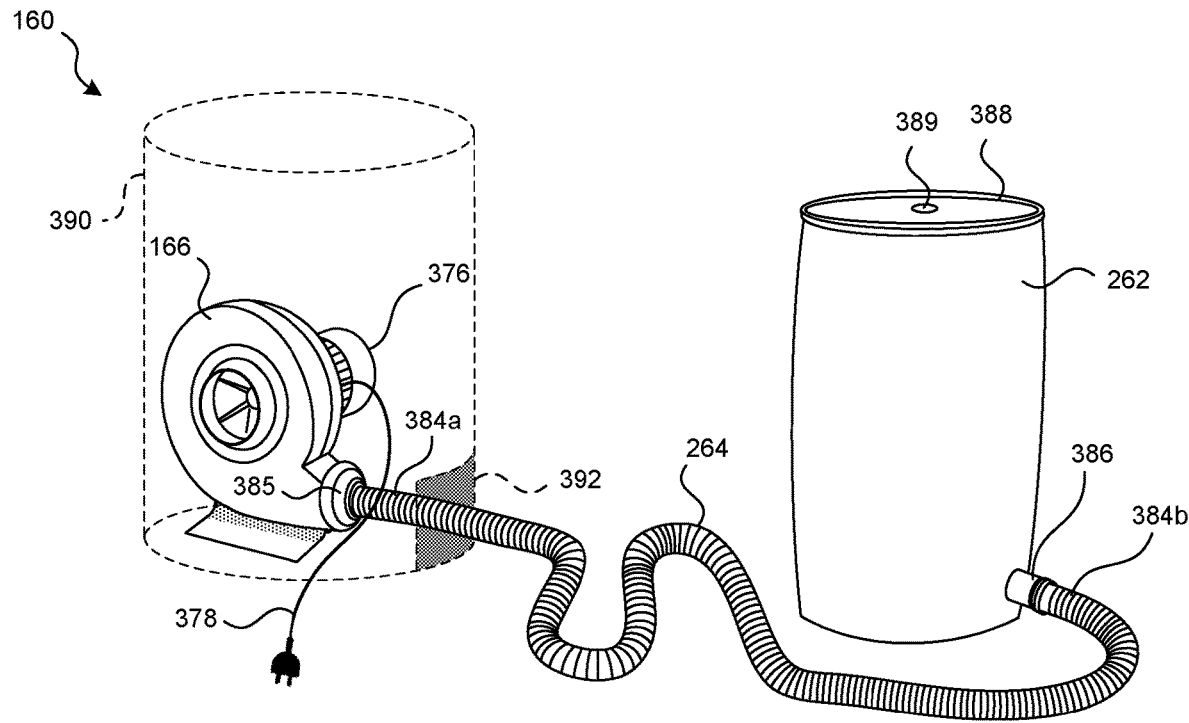
FIG. 3A is an isometric view of a crop treatment system configured in accordance with an embodiment of the present technology.

FIG. 3A is a partially schematic isometric view of the crop treatment system 160 of FIGS. 1D, 2A and 2B, and FIG. 3B is a partially cutaway schematic view of the application container 262 shown rotated clockwise approximately 45 degrees relative to FIG. 3A. Referring first to FIG. 3A, the blower 166 (e.g., a fan) includes a fan motor 376 that is electrical coupled to a power source via a cord 378. In some embodiments, as discussed above in reference to FIG. 2B, the blower 166 can be at least partially positioned in an enclosure 390 (shown transparently with dashed lines in FIG. 3A for clarity and ease of understanding). The enclosure 390 can comprise metal, plastic, fiberglass and/or another suitable material and is configured to house the blower 166 in relatively warm and dry air (e.g., air warmer than 68 degrees Fahrenheit and having a moisture content less than 80%). In the illustrated embodiment, the enclosure 390 has a generally cylindrical shape. In other embodiments, however, the enclosure 390 can have a substantially rectangular shape, a cube shape, a spherical shape and/or another suitable shape. In some embodiments, heat produced by, for example, the fan motor 376 during operation of the blower 166 warms and dries the air within the enclosure 390 to facilitate the subsequent production of the treatment agents 162 via the treatment compositions 163 stored in the application container 262. In other embodiments, however, the enclosure 390 may receive warm, dry air from an external heat source (e.g., the heater 249 of FIG. 2B). The enclosure 390 can also help prevent moisture (e.g., water condensation in the surrounding area) from entering the blower 166 and being directed toward the treatment compositions 163. The blower 166 includes an outlet receptacle 385 configured to receive a first end portion 384a of the hose 264 that fluidly couples the blower 166 to the application container 262. The hose 264 can extend through an opening 392 in a lower portion the enclosure 390 that provides inlet air to the blower 166. Although the enclosure 390 includes a single opening (e.g., opening 392) in the embodiment of FIG. 3A, in other embodiments the enclosure 390 can include other openings to let air into the enclosure 390. An inlet receptacle 386 in a sidewall of the application container 262 receives a second end portion 384b of the hose 264. In some embodiments, a filter 387 (e.g., a mesh, screen, etc.) is positioned adjacent the inlet receptacle 386 to prevent undesired material, such as water condensation, air particulate, etc., from entering the application container 262. As discussed above in reference to FIG. 2B, the hose 264 is configured to carry warm air from the blower 166 to the application container 262.

Figure 3B:
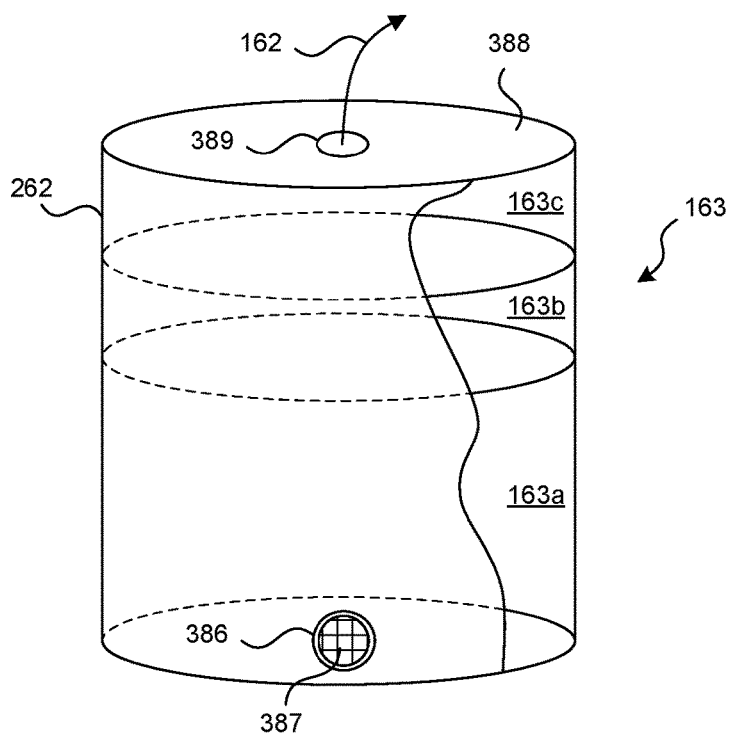
FIG. 3B is a partially cutaway schematic view of a treatment storage container of the crop treatment system of FIG. 3A.

Referring to FIGS. 3A and 3B together, the application container 262 includes a lid 388 having a vent 389 (FIG. 3B) configured to allow the treatment agents 162 to be released therethrough. The application container 262 can have a volume suitable for holding enough of the treatment compositions 163 to treat the entire storage facility (e.g., between about 20 gallons or 55 gallons, or about 30 gallons), and can be made of a suitable durable material (e.g., plastic, metal, fiberglass, rubber, etc.). In the illustrated embodiment, the application container 262 has a generally cylindrical shape. In other embodiments, however, the application container 262 can have a substantially rectangular shape, a cube shape and/or another suitable shape. As noted above with reference to FIG. 1D, the application container 262 stores the treatment compositions 163. The treatment compositions 163 can include a mixture of a first treatment composition 163a, a second treatment composition 163b, and a third treatment composition 163c. The treatment compositions 163 can include predetermined amounts of the compositions 163a, b, c to produce the treatment agents 162 at corresponding desired concentrations (e.g., gaseous chlorine dioxide at a concentration of 5 ppm, 10 ppm, 15 ppm, 20 ppm, 25, ppm, 30 ppm, 35 ppm, 40 ppm, 50 ppm). In some embodiments, for example, the first composition 163a can comprise FruitGard™ Zero Air, the second composition 163b can comprise FruitGard™ Maintenance, which includes a Maintenance Part A and a Maintenance Part B, and the third composition 163c can comprise Fruitgard™ Wipeout, which includes a Wipeout Part A and a Wipeout Part B, all of which are manufactured by ICA TriNova, LLC of Newnan, GA. In other embodiments, the individual compositions 163a, b, c can comprise any suitable chemical compositions configured to produce a suitable crop treatment agent for inhibiting spoilage of potatoes and/or other goods. In some embodiments, the individual compositions 163a, b. c include between about 1-5% sodium chlorite and 60-90% Zeolite by weight in addition to other substances (e.g., water, calcium chloride $CaCl_2$), etc.).

In some embodiments, the treatment compositions 163 comprise approximately 70% by weight of the first composition 163a (e.g., FruitGard™ Zero Air), approximately 15% by weight of the second composition 163b (e.g., FruitGard™ Maintenance), and approximately 15% by weight of the third composition 163c (Fruitgard™ Wipeout) to produce the treatment agents 162 at a desired concentration (e.g., between about 10 ppm and about 30 ppm, between about 15 ppm and about 25 ppm, or about 20 ppm). In other embodiments, however, the treatment compositions 163 can include any other suitable combination of the compositions 163a, b, c. In certain other embodiments, for example, the treatment compositions 163 may only include the compositions 163a and b. In one embodiment, for example, the treatment compositions 163 can include between approximately 90% and approximately 5% by weight of the first composition 163a (e.g., approximately 55 lbs of FruitGard™ Zero Air), and between approximately 10% and approximately 95% by weight of the second composition 163b (e.g., approximately 14 lbs of FruitGard™ Maintenance Part A and approximately 14 lbs of FruitGard™ Maintenance Part B) to produce the treatment agents 162 at a desired concentration (e.g., between about 10 ppm and about 30 ppm, between about 15 ppm and about 25 ppm, or about 20 ppm). In other embodiments, however, the treatment compositions 163 can include any suitable combination of the compositions 163a, b, and/or c, or any other suitable composition or substance.

Figure 4A:
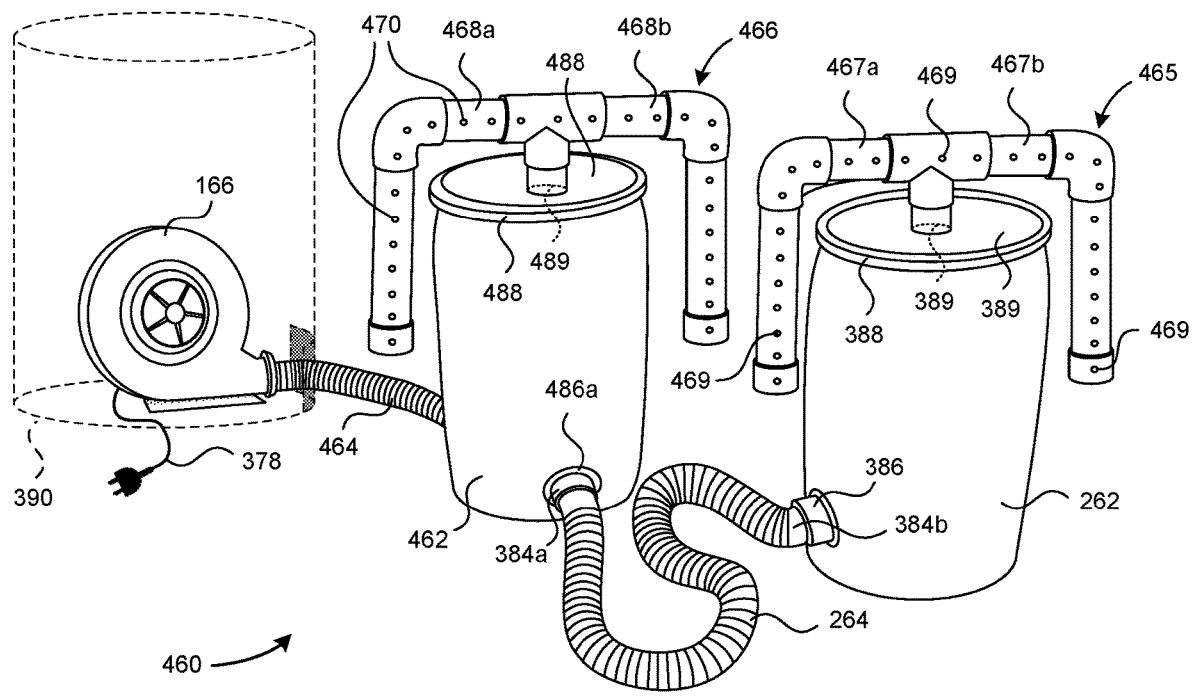
FIGS. 4A and 4B are front and rear isometric views, respectively, of a crop treatment system configured in accordance with another embodiment of the present technology.
Figure 4B:
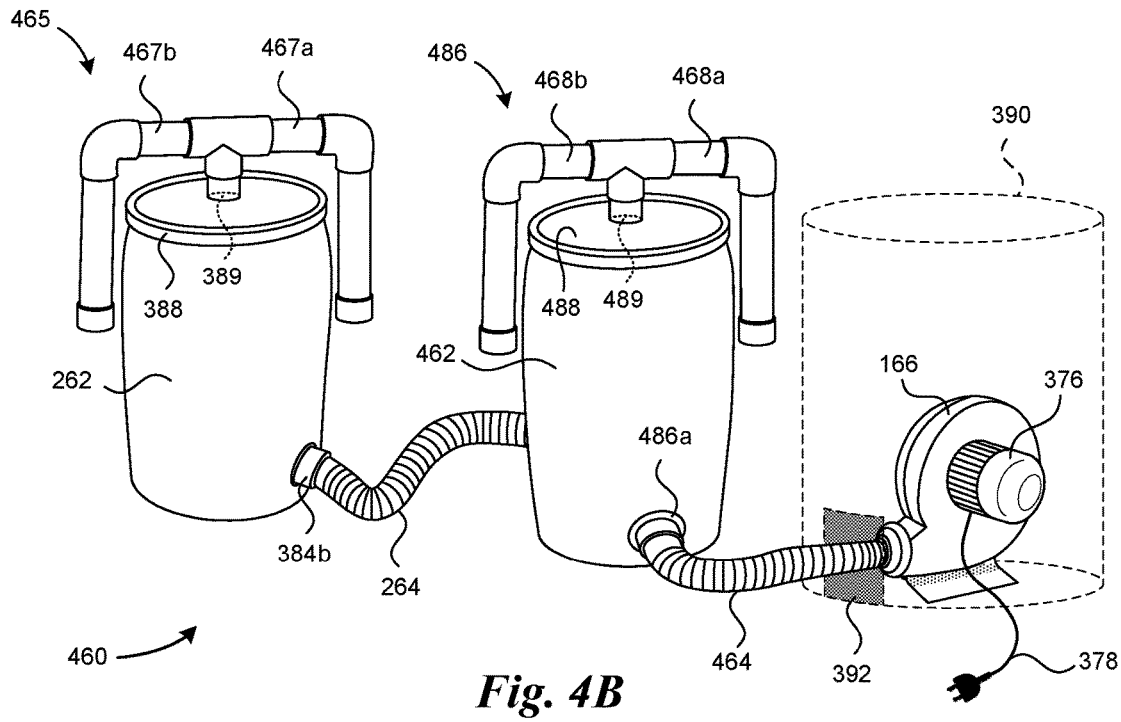

FIGS. 4A and 4B are front and rear isometric views, respectively, of a crop treatment system 460 configured in accordance with another embodiment of the present technology. In some applications, a storage facility may need an amount of treatment agent that exceeds the production capacity of a single application container (e.g., the application container 262). As such, it may be desirable to have an auxiliary system or application container to produce an additional amount of treatment agent. The crop treatment system 460 includes many of the same structures and functions described above with reference to the crop treatment system 160. For example, the crop treatment system 460 includes the application container 262 and the blower 166. Accordingly, the following description will focus on the differences between the crop treatment systems 160 and 460. Referring first to FIG. 4B, the treatment system 460 includes an auxiliary container 462 (e.g., a plastic or metal container or drum) having a lid 488 with a vent 489 configured to allow the treatment agents 162 to be released therethrough. A hose 464 fluidly couples the blower 166 in the enclosure 390 to a first inlet receptacle 486a on the auxiliary container 462. An outlet receptacle 486b in a sidewall of the auxiliary container 462 receives a second end 484b of the hose 464.

Referring to FIGS. 4A and 4B together, in the illustrated embodiment, the hose 264 fluidly couples the auxiliary container 462 to the application container 262. The treatment system 460 can further include manifolds that are fluidly coupled to the vents 389, 489 of each container 262, 462 and help facilitate the distribution of the treatment agents 162. For example, a first manifold 465 can be inserted into the application container 262 and is coupled to the vent 389 in the lid 388. The first manifold 465 includes ducting (e.g., hollow PVC piping) having a left or first portion 467a and a right or second portion 467b. A second manifold 466 can be inserted into the auxiliary container 462 and coupled to the vent 489 in the lid 488. The second manifold 466 can be at least generally similar in structure and function to the first manifold 465. For example, the second manifold 466 includes ducting (e.g., hollow PVC piping) having a left or first portion 468a and a right or second portion 468b. Each of the manifolds 465 and 466 includes a plurality of apertures 469, 470 configured to allow the treatment agents 162 in the containers 262, 462 to pass therethrough and disperse into the surrounding area (e.g., the storage facilities of FIGS. 1A-2C). In other embodiments, the shape, design and/or configuration of the manifolds 465, 466 can differ from the embodiment shown in FIGS. 4A and 4B to achieve a desired distribution of the treatment agents 162 to the surrounding area. For example, the manifolds 465, 466 may extend above the containers 262, 462 by a greater distance, or they can be omitted.

In some embodiments, the auxiliary container 462 can contain the same treatment composition 163 as the application container 262. For example, the auxiliary container 462 can include a mixture of treatment compositions 163 comprising approximately 70% by weight of the first composition 163a (e.g., FruitGard™ Zero Air), 15% by weight of the second composition 163b (e.g., FruitGard™ Maintenance), and 15% by weight of the third composition 163c (Fruitgard™ Wipeout). In other embodiments, the auxiliary container 462 can include any suitable combination of the compositions 163a, b, and/or c, or any other suitable composition or substance.

In other embodiments, the application container 262 and the auxiliary container 462 can contain different treatment compositions 163. For example, the application container 262 can contain the first composition 163a, configured to produce the treatment agents 162 at a first concentration (e.g., chlorine dioxide gas at a concentration of between about 0.5 ppm and about 10 ppm, between about 1 ppm and about 3 ppm, or about 1.5 ppm), and the auxiliary container 462 may contain the second composition 163b configured to produce the treatment agents 162 at a second concentration (e.g., chlorine dioxide gas at between about 10 ppm and about 50 ppm, between about 20 ppm and 40 ppm, or about 30 ppm). As discussed above in reference to FIGS. 3A and 3B, the relative amounts by weight and/or volume of the individual treatment compositions 163a, b, c, respectively, can be adjusted such that a desired concentration of the combined treatment agents 162 (e.g., chlorine dioxide gas at a concentration of 20 ppm) is emitted from the application container 262 and/or the auxiliary container 462 via the manifolds 465 and 466. While the embodiment shown in FIGS. 4A and 4B includes only a single auxiliary container 462, other embodiments may include additional auxiliary containers connected in series, depending on various factors, such as the size of a particular storage facility.

Figure 5A:
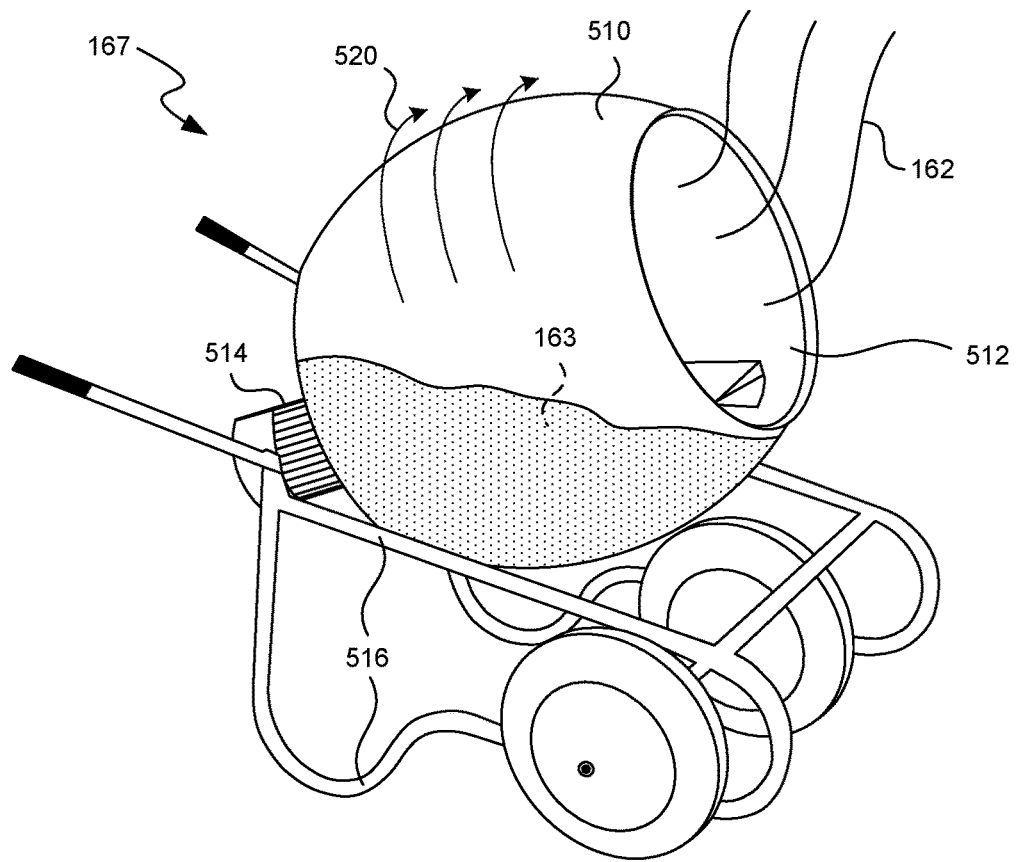
FIG. 5A is a side isometric view of an agitator configured in accordance with an embodiment of the present technology.
Figure 5B:
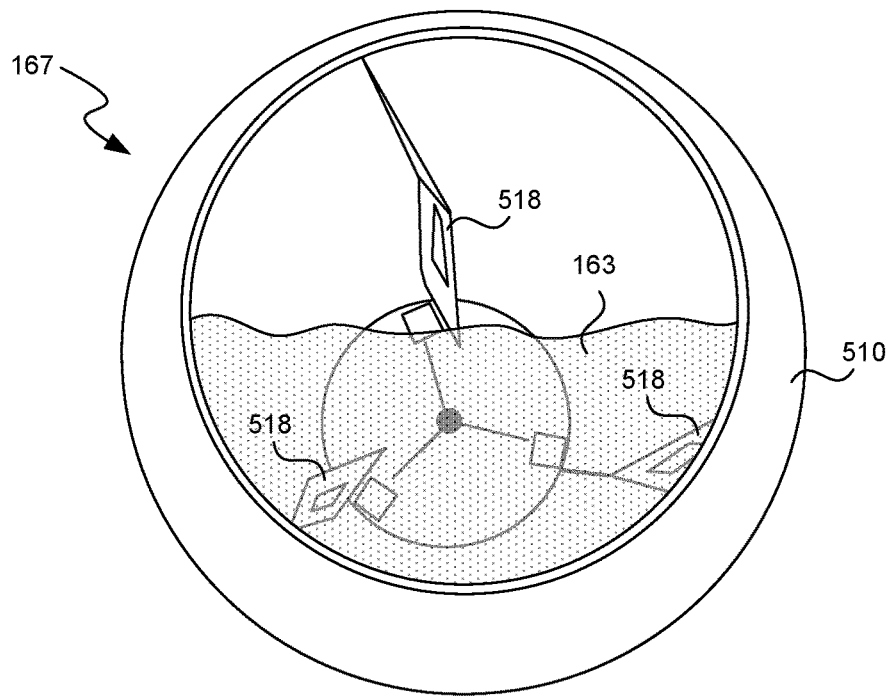
FIG. 5B is a top isometric view of the agitator shown in FIG. 5A.

FIG. 5A is an isometric view of the agitator 167 configured in accordance with an embodiment of the present technology to produce the treatment agents 162 by mixing the treatment composition 163. In the illustrated embodiment, the agitator 167 includes a hollow container 510 (e.g., a polyethylene drum) having an opening 512 therein, an electric motor 514 configured to rotate the container 510 about an axis, and a frame 516 configured to support the container 510 and facilitate easy transport and placement of the agitator 167. FIG. 5B is a top view looking into of the container 510. The container 510 can include one or more mixing elements 518 (e.g., blades) that contact and facilitate mixing of the treatment compositions 163 while the container 510 is rotating. In some embodiments, the agitator 167 is placed at an angle (e.g., between about 10-80° relative to a horizontal axis) so that the treatment agents 162 can rise out of the container 510 through the opening 512 and into the surrounding area as it is produced. In certain embodiments, the agitator 167 can comprise a wheelbarrow mixer such as, for example, a Direct Drive 6 Cubic Ft 3/4-HP 115V Portable Wheelbarrow Cement Mixer manufactured by Kushlan Products. In other embodiments, other suitable mixing/agitation devices can be used for the agitator 167.

As noted above with reference to FIG. 1E, the treatment agents 162 emitted from the agitator 167 are mixed with the cooled first air portion 144a from the one or more air coolers 138 and carried toward the goods 105. The agitator 167 is configured to mix the treatment compositions 163 described above to produce a desired concentration (e.g., 60-100 ppm) of the treatment agents 162. The treatment composition 163 used in the agitator 167 can include, for example, any combination of the individual treatment compositions 163a, b, and/or c. In some embodiments, the treatment composition 163 used in the agitator 167 can only include the third composition 163c (e.g., Fruitgard™ Wipeout) and/or the second composition 163b (e.g., FruitGard™ Maintenance). The third composition 163c can be used to produce a comparatively higher concentration (e.g., 80-100 ppm) of the treatment agents 162 over a relatively shorter period of time (e.g., 6-8 hours), and the second composition 163b can be used to produce a comparatively lower concentration (e.g., 60-80 ppm) of the treatment agents 162 over a relatively longer period of time (e.g., 8-24 hours). In some embodiments, Part A and Part B of the third composition 163c, or Part A and Part B of the second treatment composition 163b, are first mixed together in a separate container and then poured into the container 510. Once the motor 514 is turned on and begins to rotate the container 510, the Part A and Part B mixture is further mixed by the mixing elements 518. The treatment agents 162 are then released to the surrounding area and mixed with the cooled first air portion 144a.

The agitator 167 provides the ability to produce a relatively high dosage of the treatment agents 162 in a relatively short time frame to ensure harmful agents that may cause spoilage and/or decay of the goods 105 are removed. As such, the agitator 167 may be operational at only certain times and for generally shorter periods (e.g., 6-24 hours) compared to the chemical treatment systems 160 and 460, which may be operational for multiple months. The agitator 167 may be used alone, or in combination with the chemical treatment systems 160 or 460 described above.

The concentration of the treatment agents 162 that reaches the goods 105 can be controlled in multiple ways. For example, the concentration can be controlled in part by adjusting the volume of airflow being moved by the one or more air movers 142 (FIG. 1D). For a given amount of the treatment agents 162 produced from the agitator 167, the concentration of the treatment agents 162 that reaches the good 105 can be increased by decreasing the volumetric rate of airflow by, for example, reducing the speed of the one or more air movers 142 via the one or more VFDs 154. Correspondingly, the concentration of the treatment agents 162 can be decreased by increasing the volumetric rate of airflow by, for example, increasing the speed of the one or more air movers 142 via the one or more VFDs 154.

The concentration of the treatment agents 162 produced by the agitator 167 can also be controlled by adjusting a speed of rotation (shown schematically by arrows 520) of the agitator 167. In some embodiments, for example, the agitator 167 can be operably coupled to one or more VFDs (not shown) to vary the speed of rotation of the agitator 167 and control the production of the treatment agents 162. A faster speed of rotation will produce a higher concentration of the treatment agents 162, and a slower speed of rotation will produce a lower concentration of the treatment agents 162. In some embodiments, the one or more VFDs of the agitator 167 can be electrically connected to a sensor (e.g., the third sensor 172) and the controller 101 (FIG. 1D) to provide automatic control of the treatment agent concentration. For example, the controller 101 can be configured to automatically increase the speed of rotation of the agitator 167 via the one or more VFDs if the desired amount of the treatment agent concentration is too low, or decrease the speed of rotation if the concentration is too high.

The ability to control the concentration of the treatment agents 162 in multiple ways ensures that the chemical composition product used to produce the treatment agents 162 is not wasted. In some storage facilities, a difficulty with producing the treatment agents 162 often stems from producing too much of the treatment agents, and thereby wasting the individual treatment compositions (e.g., 163*a, b, c*). For example, using the wrong type of mixing device can produce too much treatment agent 162 (e.g., greater than 200 ppm) and result in a waste of individual treatment compositions. Using the correct mixing device (e.g., agitator 167) and having the ability to reduce the speed of rotation of the mixing device can help mitigate this issue.

Figure 6:
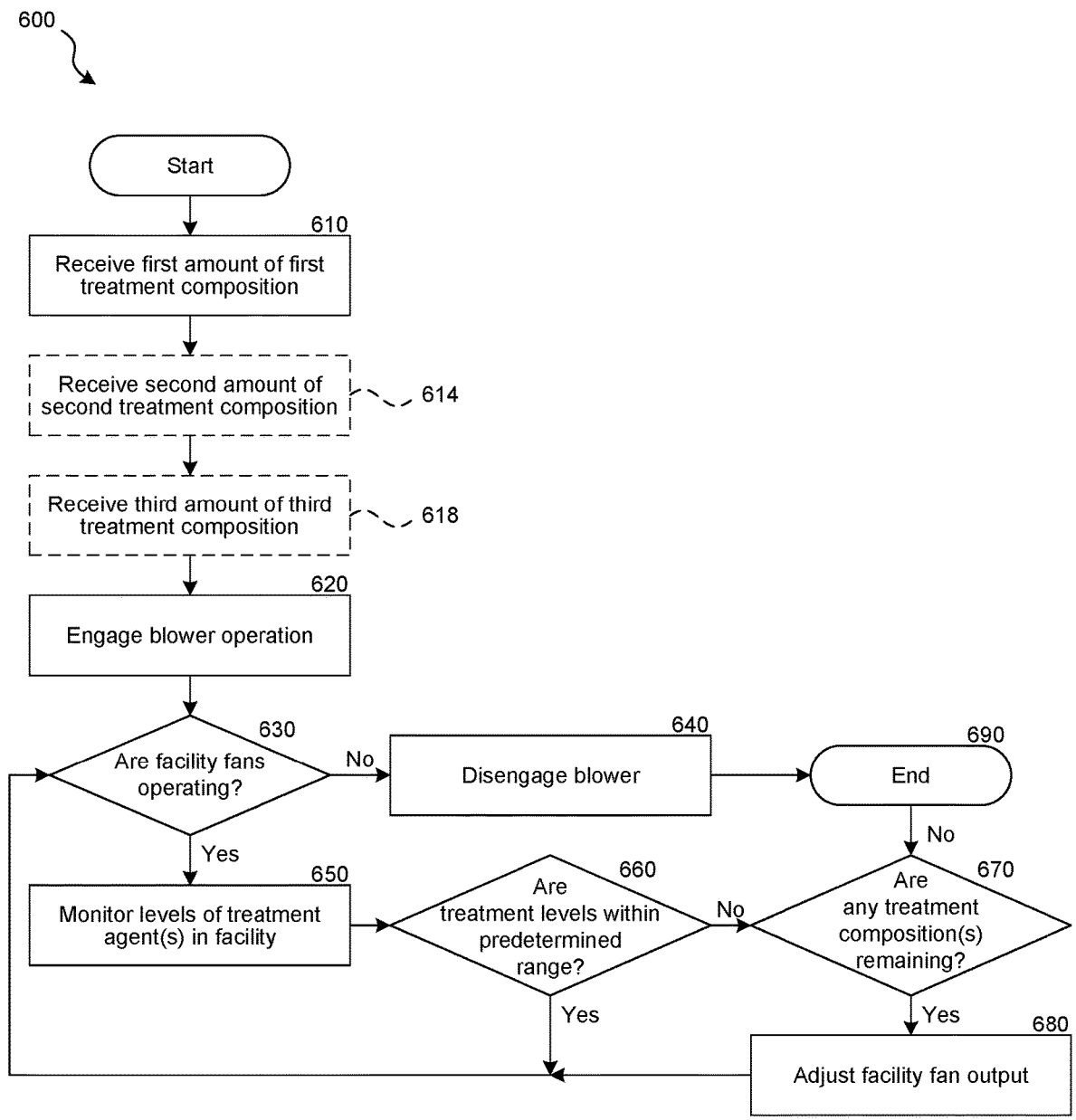
FIG. 6 is a flow diagram of a process of treating crops in accordance with an embodiment of the present technology.

FIG. 6 is a flow diagram of a process 600 of treating goods stored in a storage facility (e.g., the storage facility 100 of FIGS. 1A-2B) in accordance with an embodiment of the present technology. In some embodiments, the process 600 can include instructions stored on a memory and executed by one or more processors (e.g., one or more processors in the controller 101 of FIG. 1D).

At block 610, the process 600 detects a first amount of a first treatment composition (e.g., the first treatment composition 163*a* of FIG. 3B) in a treatment application container (e.g., the application container 262). In some embodiments, the first treatment composition includes a combination of chemicals (e.g., a zeolite, sodium chlorite and/or calcium chloride, FruitGard™ Zero Air, etc.) that, when combined, produce one or more crop treatment agents at a first concentration (e.g., between 1 ppm and 5 ppm, or about 1.5 ppm). In some embodiments, the crop treatment agent(s) can inhibit growth of organisms that can cause spoilage and/or decay of crops (e.g., potatoes or onions) in a storage facility. In other embodiments, however, the crop treatment agent 162 may have other suitable uses such as, for example, sprout inhibition in tubers and/or other crops. In some embodiments, the process 600 detects the first amount of the first treatment composition via manual input received from an operator (e.g., touch or other manual input received via the controller 101).

At block 614, the process 600 optionally detects a second amount of a second treatment composition (e.g., the second treatment composition 163*b* of FIG. 3B, FruitGard™ Maintenance, etc.) configured to produce a second concentration (e.g., between about 10 ppm and 40 ppm) of a treatment agent (e.g., chlorine dioxide gas). Similarly, at block 618, the process optionally detects a third amount of a third treatment composition (e.g., the third treatment composition 163*c* of FIG. 3B, FruitGard™ Wipeout, etc.) configured to produce a third concentration (e.g., greater than 40 ppm) of the treatment agent (e.g., chlorine dioxide gas). In some embodiments, the second and third treatment compositions can be configured to produce the same treatment agent as the first treatment composition in corresponding second and third concentrations. In other embodiments, the second treatment composition can be configured to produce a second treatment agent (e.g., peracetic acid) different from the first treatment agent. Similarly, the third treatment composition can be configured to produce a third treatment agent (e.g., ozonated water) different from the first treatment agent. In some embodiments, the process 600 detects the amount(s) of the first, second and/or third treatment composition (s) via manual input received from the operator (e.g., touch or other manual input received via the controller 101).

At block 620, the process 600 engages operation of (i.e., starts) a blower (e.g., the blower 166 of FIG. 1D and/or the blower 166 of FIGS. 2A-4B) fluidly coupled to the first treatment composition received at block 610. In some embodiments, as discussed above in reference to FIG. 2B, the blower can be located in a room having a warmer and/or dryer environment than the stored crops. In other embodiments, as discussed above in reference to FIGS. 3A-4B, the blower can be positioned in an enclosure (e.g., the enclosure 390 of FIGS. 3A, 4A and 4B). As further discussed above, positioning the blower in a relatively warm and dry environment and fluidly coupling the blower to the treatment composition(s) can advantageously increase output of the treatment agent(s) compared to cooler, humid air.

At decision block 630, the process 600 determines whether one or more air movers (e.g., the one or more air movers 142 of FIG. 1D) in the facility are operating. In some embodiments, the process 600 receives signals indicative of the operation of the one or more air movers from a sensor (e.g., the sensor 171 of FIG. 1D) in the storage facility. If the process 600 fails to detect operation of at least one of the one or more air movers, the process 600 proceeds accordingly to block 640 and disengages (i.e., stops) operation of the blower. As discussed above in reference to FIG. 1D, directing the flow of air from the blower toward the treatment composition(s) can facilitate and/or cause the corresponding production of treatment agent(s). In the absence of operation of the one or more air movers in the storage facility, however, an amount of treatment agent can build up and excessively high concentrations. The process 600 therefore is configured to stop operation of the blower to preferably avoid an excessive production of the treatment agent beyond unsafe levels if the facility fans are not operating. Otherwise, the process 600 proceeds to block 650.

At block 650, the process 600 monitors levels of the treatment agent in the storage facility using one or more sensors (e.g., one or more of the sensors 172 of FIG. 1D) positioned in the storage facility.

At decision block 660, the process 600 determines whether levels of the treatment agent(s) are within a predetermined range (e.g., 15 ppm-25 ppm of chlorine dioxide gas). If the process 600 determines that the levels measured at block 650 are within the predetermined range, the process 600 returns to decision block 630 and continues to confirm whether the facility fan(s) are operating and monitor levels of the treatment agent(s) in the facility (block 650). Otherwise, the process 600 proceeds to decision block 670.

At block 670, after determining that levels of the treatment agent in the facility are not within in a predetermined range, the process 600 determines whether any treatment composition is remaining. In some embodiments, the process 600 can receive a signal from a sensor (e.g., the sensor 170 of FIG. 1D) indicative of an amount of treatment composition remaining. In one embodiment, for example, the sensor 170 can comprise a scale positioned beneath the treatment compositions 163 and configured to determine a weight or mass of the remaining treatment compositions 163. In other embodiments, however, another suitable sensor configured to determine a remaining amount of the treatment composition can be used. If the process 600 determines that there is indeed an insufficient amount of the treatment composition remaining (e.g., 5% or less of an initial amount of the treatment composition), then the process ends at block 690. Otherwise, the process proceeds to block 680.

At block 680, the process 600 can adjust an output of the facility fans (e.g., the one or more movers 142 of FIG. 1D) in response to the determination at block 660 that measured treatment agent levels and/or concentrations are not within a predetermined range. If, for example, the process 600 detects an excessively high level of the treatment agent (e.g., chlorine dioxide gas at a concentration greater than 30 ppm), the process 600 can correspondingly increase an airflow output by the one or more air movers. Conversely, if the process 600 detects an excessively low level of the treatment agent (e.g., chlorine dioxide gas at a concentration less than about 15 ppm), the process 600 can decrease an airflow output by the one or more air movers. In some embodiments, the process 600 can adjust the airflow output using one or more VFDs (e.g., the one or more VFDs 154 of FIG. 1D) to correspondingly increase or decrease facility fan output. After adjustment of the fan output, the process 600 returns back to decision block 630 and continues to confirm that the facility fans are operating to monitor levels of the treatment agent(s) in the facility.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. Some alternative implementations of the invention may include not only additional elements to those implementations noted above, but also may include fewer elements. For example, the storage facility 100 described above may include one or more of the air movers 142 without any of the one or more VFDs 154. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A method of treating crops stored in a crop storage area of a crop storage facility, the method comprising:
    releasing a crop treatment agent in the crop storage facility;
    operating an air mover to flow the crop treatment agent toward the crop storage area;
    monitoring a level of the crop treatment agent in the crop storage facility; and
    adjusting an operational setting of the air mover via a variable frequency drive based at least in part on the monitored level of the crop treatment agent in the crop storage facility.

2. The method of claim 1 wherein the operational setting includes an operational speed of the air mover.

3. The method of claim 1 wherein adjusting the operational setting of the air mover based at least in part on the monitored level of the crop treatment agent includes:
    adjusting the operational setting of the air mover via the variable frequency drive to increase the level of the crop treatment agent in the crop storage facility in response to the monitored level of the crop treatment agent in the crop storage facility being too low; and/or
    adjusting the operational setting of the air mover via the variable frequency drive to decrease the level of the crop treatment agent in the crop storage facility in response to the monitored level of the crop treatment agent in the crop storage facility being too high.

4. The method of claim 3 wherein:
adjusting the operational setting of the air mover via the variable frequency drive to increase the level of the crop treatment agent includes decreasing an operational speed of the air mover; and
adjusting the operational setting of the air mover via the variable frequency drive to decrease the level of the crop treatment agent includes increasing an operational speed of the air mover.

5. The method of claim 1 wherein adjusting the operational setting of the air mover via the variable frequency drive based at least in part on the monitored level of the crop treatment agent includes automatically adjusting the operational setting of the air mover via the variable frequency drive.

6. The method of claim 1 wherein the crop treatment agent includes chlorine dioxide, ozone, ozonated water, hydrogen peroxide, peracetic acid, and/or sodium hypochlorite.

7. The method of claim 1 wherein monitoring the level of the crop treatment agent in the crop storage facility includes measuring a concentration of the crop treatment agent in the crop storage area.

8. A method of treating crops stored in a crop storage area of a crop storage facility, the method comprising:
operating an air mover to flow a crop treatment agent toward the crop storage area;
monitoring a level of the crop treatment agent in the crop storage facility;
if the level of the crop treatment agent in the crop storage facility is above a predetermined range, adjusting an operational setting of the air mover via a variable frequency drive to decrease the level of the crop treatment agent in the crop storage facility;
if the level of the crop treatment agent in the crop storage facility is below the predetermined range, adjusting the operational setting of the air mover via the variable frequency drive to increase the level of the crop treatment agent in the crop storage facility; and
if the level of the crop treatment agent is within the predetermined range, maintaining the operational setting of the air mover to maintain the level of the crop treatment agent in the crop storage facility.

9. The method of claim 8 wherein the operational setting includes an operational speed of the air mover.

10. The method of claim 9 wherein adjusting the operational setting of the air mover via the variable frequency drive to increase the level of the crop treatment agent in the crop storage facility includes decreasing the operational speed of the air mover.

11. The method of claim 9 wherein adjusting the operational setting of the air mover via the variable frequency drive to decrease the level of the crop treatment agent in the crop storage facility includes increasing the operational speed of the air mover.

12. The method of claim 9 wherein the crop treatment agent includes chlorine dioxide, ozone, ozonated water, hydrogen peroxide, peracetic acid, and/or sodium hypochlorite.

13. The method of claim 8, further comprising producing the crop treatment agent at a position downstream of the air mover.

14. The method of claim 8 wherein monitoring the level of the crop treatment agent in the crop storage facility includes measuring a concentration of the crop treatment agent using one or more sensors.

15. A crop storage facility, comprising:
a crop storage area;
an inlet configured to receive air from outside the crop storage facility;
an air mover configured to move at least a portion of air from the inlet toward the crop storage area;
a crop treatment agent generator configured to release a crop treatment agent, wherein the crop treatment agent mixes with a portion of air flowing from the air mover toward the crop storage area; and
a variable frequency drive operably connected to the air mover and configured to adjust an amount of air moving from the air mover toward the crop storage area to control a concentration of the crop treatment agent in the crop storage area.

16. The crop storage facility of claim 15 wherein the crop treatment agent includes chlorine dioxide, ozone, ozonated water, hydrogen peroxide, peracetic acid, and/or sodium hypochlorite.

17. The crop storage facility of claim 15 wherein the variable frequency drive is configured to operate the air mover at least at a first speed and a second speed different than the first speed, wherein operating the air mover at the first speed provides a first concentration of the crop treatment agent in the crop storage area and operating the air mover at the second speed provides a second concentration of the crop treatment agent in the crop storage area different than the first concentration.

18. The crop storage facility of claim 15, further comprising a plenum extending at least partially between the air mover and the crop storage area, wherein the crop treatment agent generator is positioned in the plenum and configured to agitate a crop treatment composition to produce the crop treatment agent in the plenum.

19. The crop storage facility of claim 18 wherein the crop treatment agent generator includes a container and one or more mixing elements, and wherein at least one of the container and the one or more mixing elements are configured to rotate to agitate the crop treatment composition.

20. The crop storage facility of claim 15, further comprising:
one or more sensors configured to measure a concentration of the crop treatment agent in the crop storage facility; and
a controller operably connected to the variable frequency drive, wherein—
the one or more sensors are configured to transmit a signal indicative of the measured concentration to the controller, and
the controller is configured to automatically adjust a setting of the variable frequency drive based on the signal.

* * * * *